(12) United States Patent
Matthews, III et al.

(10) Patent No.: US 10,228,063 B2
(45) Date of Patent: Mar. 12, 2019

(54) IN SITU GASKET ASSEMBLY

(71) Applicant: Emerson Vulcan Holding LLC, St. Louis, MO (US)

(72) Inventors: Kenneth Heidt Matthews, III, Kingwood, TX (US); Kevin Lewis Swicegood, Missouri City, TX (US)

(73) Assignee: Emerson Vulcan Holding LLC, St. Louis, MO (US)

( * ) Notice: Subject to any disclaimer, the term of this patent is extended or adjusted under 35 U.S.C. 154(b) by 0 days.

(21) Appl. No.: 15/719,273

(22) Filed: Sep. 28, 2017

(65) Prior Publication Data

US 2018/0017170 A1 Jan. 18, 2018

Related U.S. Application Data

(63) Continuation-in-part of application No. 15/471,950, filed on Mar. 28, 2017.

(60) Provisional application No. 62/318,827, filed on Apr. 6, 2016.

(51) Int. Cl.
| | |
|---|---|
| *F16K 1/226* | (2006.01) |
| *F16K 27/02* | (2006.01) |
| *F16K 25/00* | (2006.01) |
| *F16K 1/44* | (2006.01) |
| *F16K 15/10* | (2006.01) |

(52) U.S. Cl.
CPC .............. *F16K 1/2263* (2013.01); *F16K 1/44* (2013.01); *F16K 15/10* (2013.01); *F16K 25/005* (2013.01); *F16K 27/0218* (2013.01)

(58) Field of Classification Search
CPC . F16K 1/42; F16K 1/425; F16K 1/427; F16K 1/465; F16K 27/0218; F16K 27/0245; F16K 27/02; F16K 27/00; F16K 1/2263; F16K 1/22; F16K 1/226; F16K 25/00; Y10T 137/6048; Y10T 137/6052
See application file for complete search history.

(56) References Cited

U.S. PATENT DOCUMENTS

| | | | | |
|---|---|---|---|---|
| 3,471,123 A | * | 10/1969 | Carlson | .................... F02M 5/12 137/434 |
| 3,472,284 A | * | 10/1969 | Hosek | ....................... F16K 1/22 137/68.23 |
| 3,739,589 A | | 6/1973 | Wolfe | |
| 4,064,003 A | * | 12/1977 | Newton | ................... F22B 1/063 137/68.28 |
| 4,225,112 A | | 9/1980 | Libke | |
| 4,422,894 A | | 12/1983 | Atkinson et al. | |

(Continued)

OTHER PUBLICATIONS

Angle Valve; MDC Vacuum Products, LLC; retrieved from the Internet Nov. 6, 2017; <https://www.mdcvacuum.com/DisplayContentPage.aspx?cc=74584585-27e6-4bad-a6e1-3939e2acc984>.

(Continued)

*Primary Examiner* — Marina Tietjen
(74) *Attorney, Agent, or Firm* — Quarles & Brady LLP

(57) ABSTRACT

Some embodiments of the invention provide a valve including a body, a valve element arranged within the body to selectively inhibit flow through the body, and a seal assembly that includes a gasket, a cutter seat, and a retaining ring. The cutter seat includes a cutter that is arranged to cut the body gasket during installation. A two-plane seal is formed by cutting the body gasket between the retaining ring and the body.

20 Claims, 22 Drawing Sheets

(56) References Cited

U.S. PATENT DOCUMENTS

| | | | |
|---|---|---|---|
| 4,681,329 A | | 7/1987 | Contin |
| 6,006,938 A | * | 12/1999 | Mozley ............... F16K 17/1606 |
| | | | 137/68.19 |
| 6,431,383 B1 | | 8/2002 | Mozley et al. |
| 7,193,491 B2 | | 3/2007 | Leadley-Brown et al. |
| 2001/0005007 A1 | | 6/2001 | Eggleston |
| 2005/0087930 A1 | | 4/2005 | D'Amico et al. |
| 2005/0252560 A1 | * | 11/2005 | Anderson ........... F16K 11/0876 |
| | | | 137/625.47 |
| 2011/0260413 A1 | | 10/2011 | Voltenburg et al. |
| 2013/0168590 A1 | | 7/2013 | Zlindra et al. |
| 2013/0193651 A1 | | 8/2013 | Fracz et al. |
| 2014/0231689 A1 | * | 8/2014 | Knutsson ............. B65D 77/061 |
| | | | 251/306 |

OTHER PUBLICATIONS

Keystone Model Winn Hiseal High Performance Butterfly Valves; Copyright 2012 Pentair Ltd.; 4 pages.

International Search Report for PCT/US2017/24552; dated Jun. 19, 2017; 3 pages.

\* cited by examiner

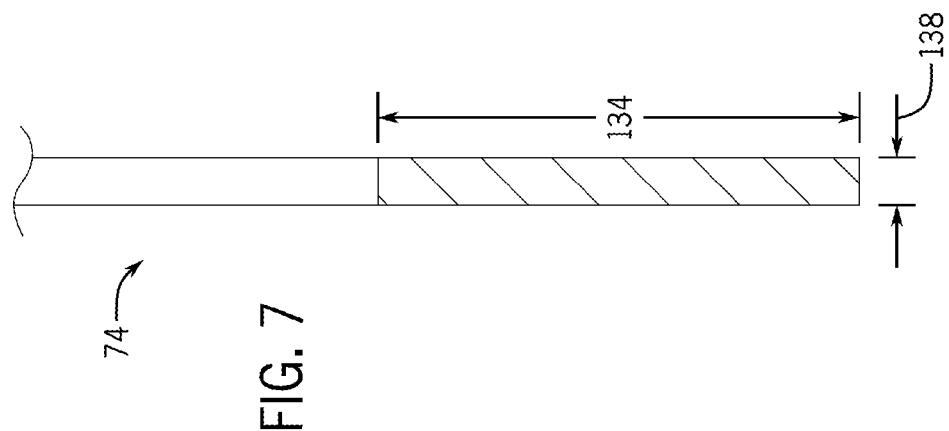
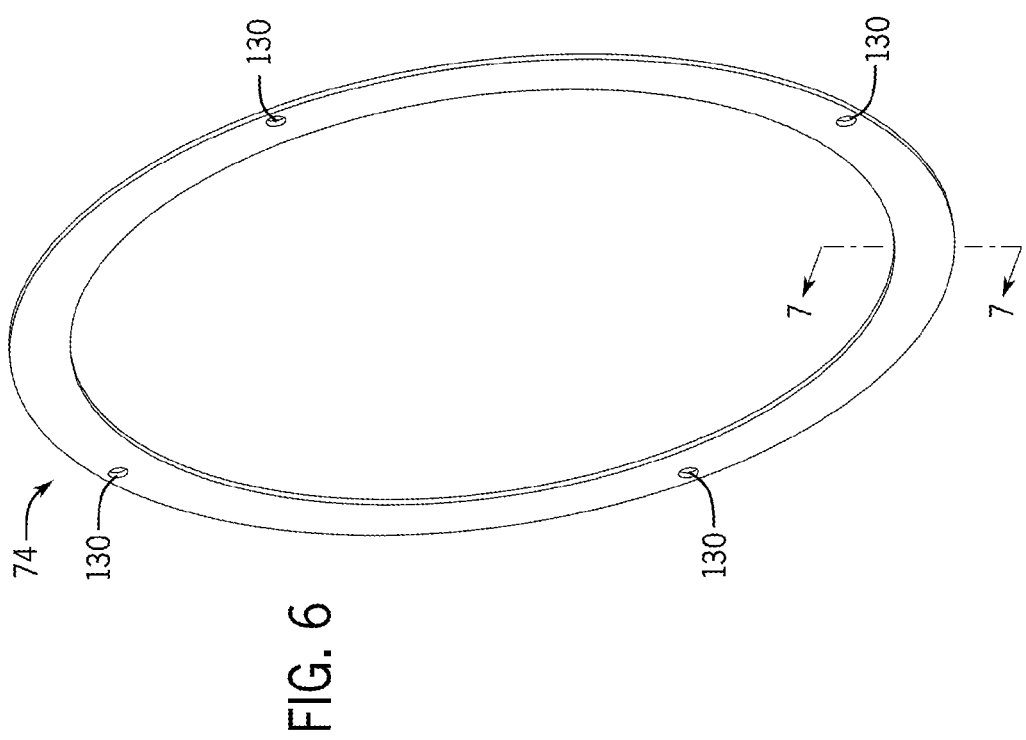

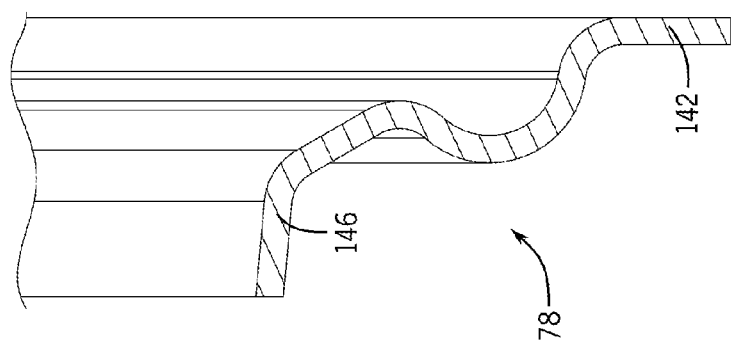
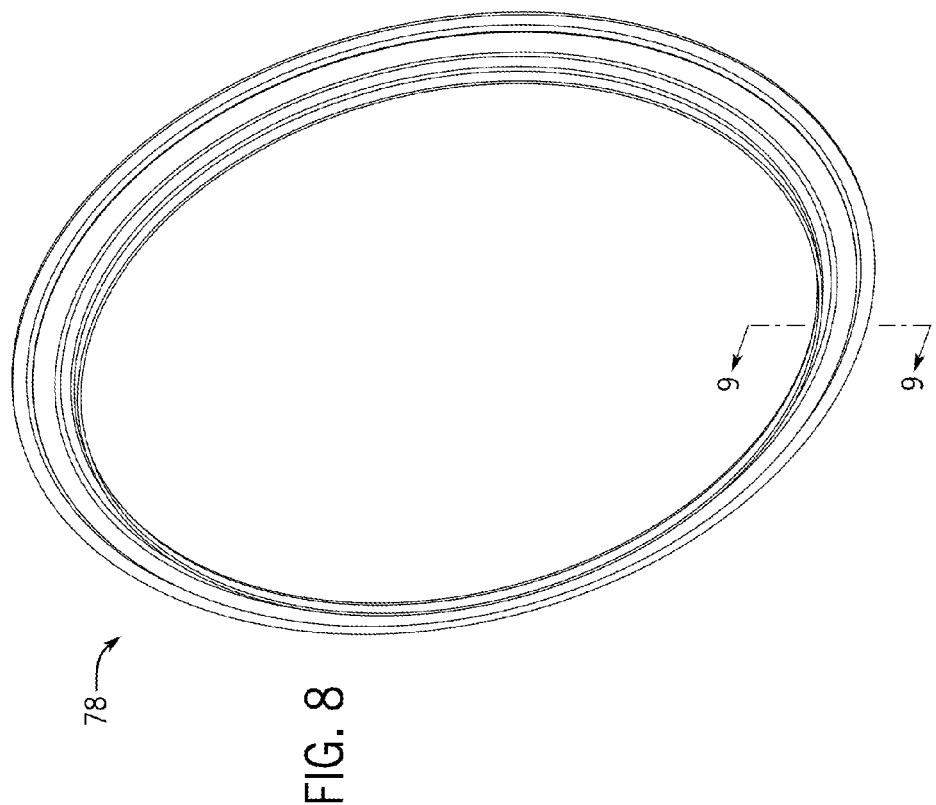

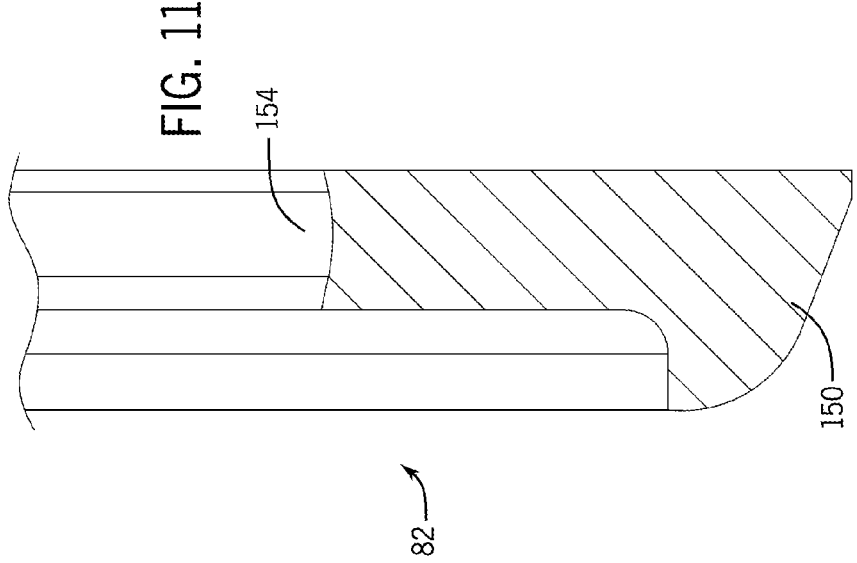
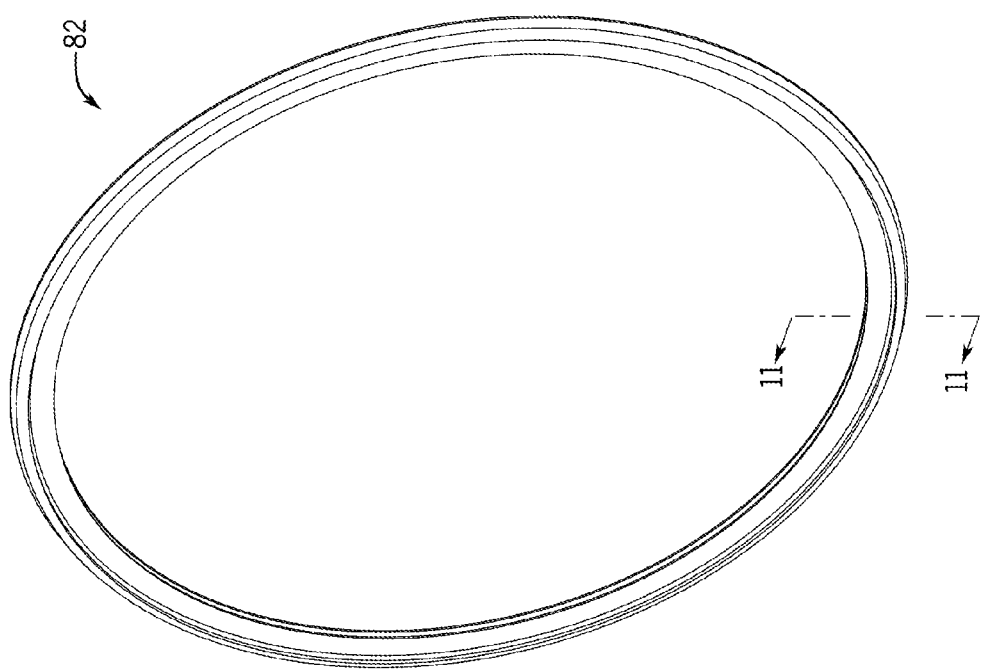

IN SITU GASKET ASSEMBLY

CROSS-REFERENCE TO RELATED APPLICATIONS

This application is a continuation-in-part of U.S. patent application Ser. No. 15/471,950, entitled "Gasket Seal Seat Ring" and filed Mar. 28, 2017, which claims the benefit of U.S. Provisional Patent Application Serial No. 62/318,827, entitled "Gasket Seal Seat Ring" and filed on Apr. 6, 2016. The entire disclosures of both documents are incorporated herein in their entirety.

BACKGROUND

Valve designs can employ multiple methods of installation of the sealing element in their design. High performance double offset valves generally hold the sealing element between the primary body section and a secondary removable seat retainer. This joint connection must be sealed, or leakage between the body and seat retainer ring may occur. In "end of line service" the seat retainer ring must hold the rated differential of the valve without support from the low pressure side mating flange. Accurate placement of the seal between the two components, seal integrity during handling and an efficient assembly process are essential.

SUMMARY OF THE INVENTION

Industry standards and market-driven pressure for design efficiency have pushed valve designers to try and seal with smaller surface areas. The proposed device allows for an initial sealing media (e.g., gasket) to be applied to multiple sealing planes within a pressure system and allows for sealing media to adjust to geometric differences within the pressure system. Using the fragile sealing material handling and transport strategies disclosed herein, embodiments within the scope of the present disclosure may produce seal dimensions that are smaller than current traditional methods of sealing.

Some embodiments of the invention provide a valve. The valve has a body having a channel extending through the valve and a first sealing surface and a second sealing surface each positioned radially outward from the channel and offset from one another. The offset between the first sealing surface and the second sealing surface defines a bore. A valve element may be positioned within the channel and may be configured to selectively inhibit flow through the body. A gasket may abut a portion of the first sealing surface and a portion of the second surface. In some embodiments, a cutter seat is at least partially received within the bore and is configured to compressively engage the second sealing surface. The cutter seat may comprise a cutter that is configured to create a first sub-gasket and a second sub-gasket by severing the gasket during installation. A retaining ring may be coupled to the valve body. The retaining ring may comprise a first mating surface and a second mating surface, where the first mating surface is configured to compressively engage the first sub-gasket and the first sealing surface of the body, while the second mating surface is configured to compressively engage the cutter seat, second sub-gasket, and second sealing surface.

In some embodiments, the cutter comprises a sharpened edge and a flat mating surface. The sharpened edge may be configured to shear a unitary gasket into at least the first and second sub-gaskets. The flat surface may be configured to compressively engage the second sealing surface of the body. In some embodiments, the sharpened edge of the cutter extends forwardly beyond the flat mating surface of the cutter seat. The sharpened edge may contact the unitary gasket during installation of the cutter seat into the bore before the flat mating surface of the cutter seat contacts the unitary gasket. In some embodiments, the second sealing surface of the body comprises a channel extending into a portion of the second sealing surface to accommodate the cutter of the cutter assembly.

In some embodiments, the cutter may further comprise a gasket trap. The gasket trap may be formed of two surfaces extending inwardly from the sharpened edge and the flat mating surface, and may form an angle between about 30° and about 150°. In some embodiments, a portion of the second sealing surface of the body extends into the gasket trap to define an approximately v-shaped cavity between the cutter seat and the body, and the v-shaped cavity is configured to extrude the second sub-gasket into an approximately v-shaped cross-section when the second sub-gasket is compressed between the cutter seat and the body.

In some embodiments, the second sealing surface of the body comprises one or more grooves extending into the second sealing surface, and the one or more grooves are configured to selectively compress a portion of the second sub-gasket.

In some embodiments, a portion of the second sealing surface of the body is configured to compressively engage a soft seat. The soft seat may be formed of a material selected from the group consisting of reinforced tetrafluoroethylene (RTFE) and reinforced polytetrafluoroethylene (RPTFE). In some embodiments, the cutter seat comprises a sealing portion extending radially inward into a portion of the channel, and the sealing portion is configured to engage and disengage a disk of the valve during operation.

Some embodiments of the invention provide a valve. The valve may comprise a valve body having a channel extending there through. A graphite gasket may be configured to be received on a first surface of the valve body. The first surface of the valve body may extend radially outward from the channel. The valve further comprises a cutter seat comprising a cutter configured to sever the graphite gasket into at least a first annular sub-gasket and a second annular sub-gasket by compressively contacting the graphite gasket with a sharpened edge. The cutter seat may be configured to engage a second surface of the valve body. The second surface of the valve body may extend radially outward from the channel and may be inwardly offset from the first surface of the valve body. The valve may further comprise a seat retaining ring configured to compress the first surface of the valve body, the graphite gasket, and the cutter seat.

In some embodiments, the cutter seat comprises a mating surface configured to abut against the second surface of the valve body, and the sharpened edge may extend forwardly beyond the mating surface. A channel may extend through a portion of the second sealing surface of the valve body to receive a portion of the cutter.

In some embodiments, the cutter seat comprises a sealing portion configured to engage and disengage a disk of the valve. The sealing portion may have an arcuate shape extending radially inward from an outer surface of the cutter seat. In some embodiments, the cutter comprises a gasket trap formed of two angled surfaces extending inwardly from the sharpened edge and the mating surface. In some embodiments, these surfaces form an angle between about 60° and about 120°. In some embodiments, the valve further comprises a soft seat configured to abut against the second surface of the valve body and the cutter seat.

In some embodiments, a method of forming a multiple-plane seal within a valve assembly is provided. The method may comprise the step of providing a valve body. The valve body may have a channel extending there through, a first surface positioned radially outward from the channel, and a second surface located radially and axially inward from the first surface, so that the offset between the first surface and the second surface defines a cylindrical bore. The method may further comprise the step of positioning a gasket on the first surface of the valve body so that a portion of the gasket extends radially inward beyond the first surface to cover a portion of the cylindrical bore. In some embodiments, the method may further comprise urging a cutting element into the cylindrical bore towards the second surface of the valve body. The cutting element may provide a sharpened edge approximately adjacent to a circumferential surface of the cylindrical bore, thereby cutting the portion of the gasket extending radially inward beyond the first surface of the valve body to form at least two annular sub-gaskets. The first sub-gasket may reside on the first surface of the valve body and the second sub-gasket may reside on the second surface of the valve body. The method may further comprise coupling a retaining ring to the valve body in a way that causes the retaining ring to compress the first sub-gasket between a first surface of the retaining ring and the first surface of the valve body and in a way that compresses the second sub-gasket between the cutting element and the second surface of the valve body.

In some embodiments, the gasket, valve body first surface, valve body second surface, and cutting element are all positioned substantially concentric with the channel extending through the valve body.

In some embodiments, the cutting element is formed integrally as part of a metal cutter seat having an outer surface defined by a radius slightly smaller in size than the radius defining the cylindrical bore.

In some embodiments, the step of coupling the retaining ring to the valve body is performed by threading a plurality of fasteners through the retaining ring into a plurality of threaded holes in the valve body.

These and other features of the present disclosure will become more apparent from the following description of the illustrative embodiments.

BRIEF DESCRIPTION OF DRAWINGS

FIG. 6 is a top, front perspective view of a body gasket of the butterfly valve of FIG. 1.

FIG. 7 is a sectional view of the body gasket taken along line 7-7 of FIG. 6.

FIG. 8 is a top, front perspective view of a metal seat of the butterfly valve of FIG. 1.

FIG. 9 is a sectional view of the metal seat taken along line 9-9 of FIG. 8.

FIG. 10 is a top, front perspective view of a soft seat of the butterfly valve of FIG. 1.

FIG. 11 is a sectional view of the soft seat taken along line 11-11 of FIG. 10.

DETAILED DESCRIPTION OF THE INVENTION

Figure 1:
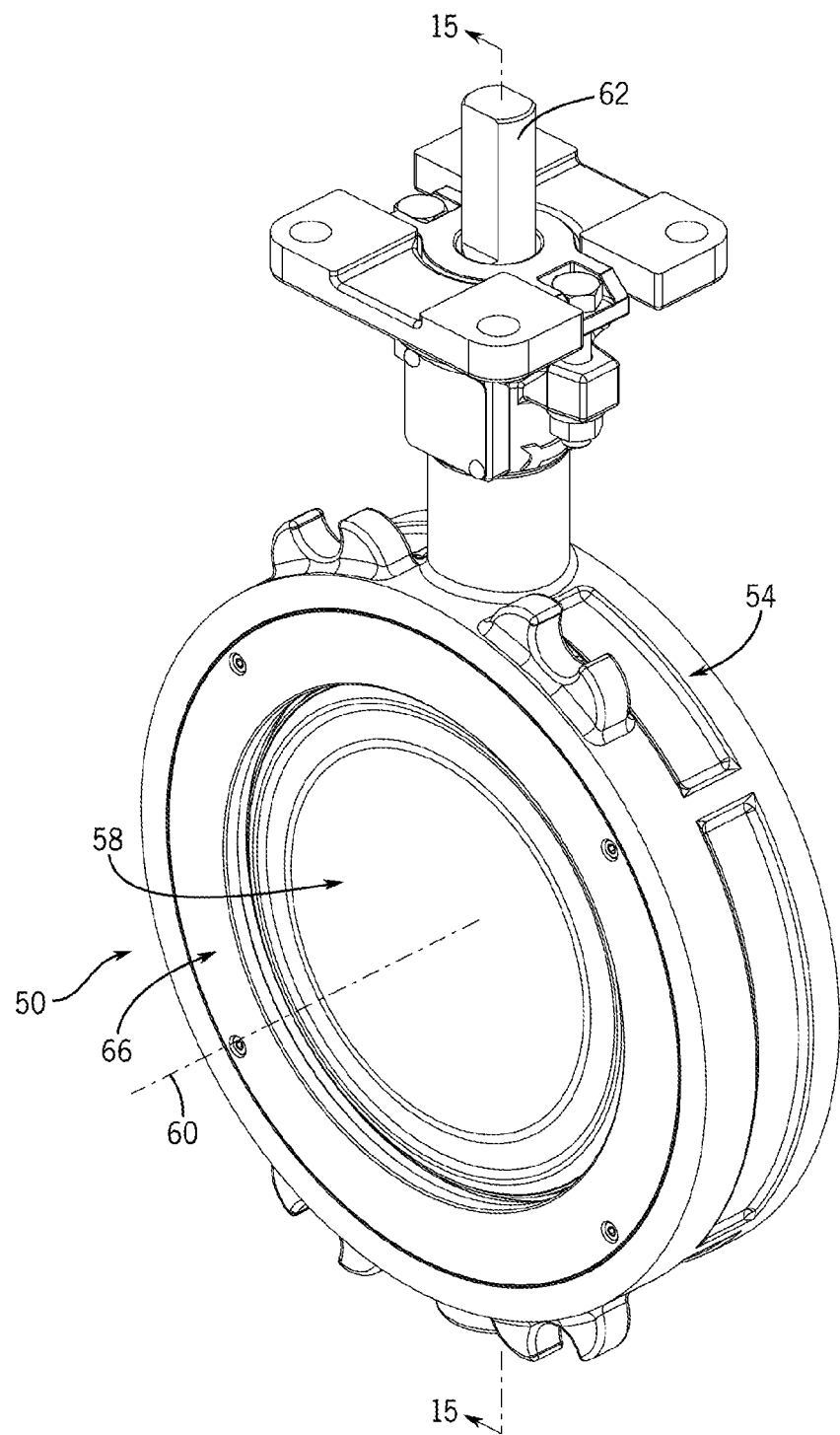
FIG. 1 is a perspective view of a butterfly valve according to one embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Figure 2:
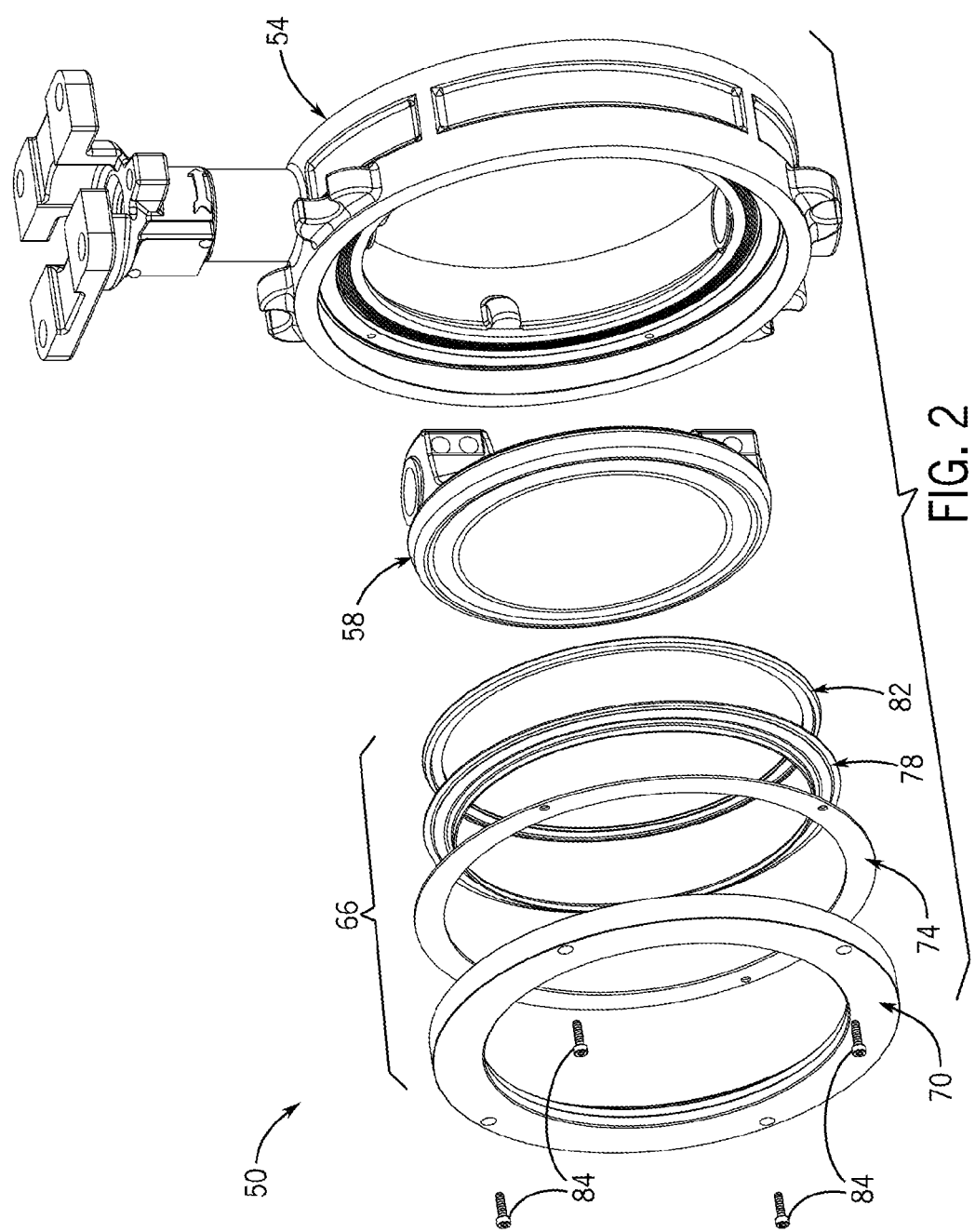
FIG. 2 is an exploded view of the butterfly valve of FIG. 1.

FIG. 1 shows a butterfly valve 50 that includes a body 54, a disk 58 rotatable between an open position and a closed position for selectively providing and inhibiting flow along a flow axis 60, a shaft 62 coupled to the disk 58 to cause rotation of the disk 58, and a sealing assembly 66. The butterfly valve 50 may be used for controlling the flow of fluids or gases. As shown in FIG. 2, the sealing assembly 66 includes a retaining ring 70, a body gasket 74, a metal seat 78, and a soft seat 82. Multiple arrangements of seats 78 and 82 are potentially available for end user selection. Fasteners 84 may couple the sealing assembly 66 to the body 54. Various arrangements of fasteners 84 may be present as valve 50 design requirements change. For example, the fasteners 84 may be screws, bolts, clips, clamps, or any other suitable fastening mechanism. Still further, the fasteners 84 need not all be the same.

Figure 3:
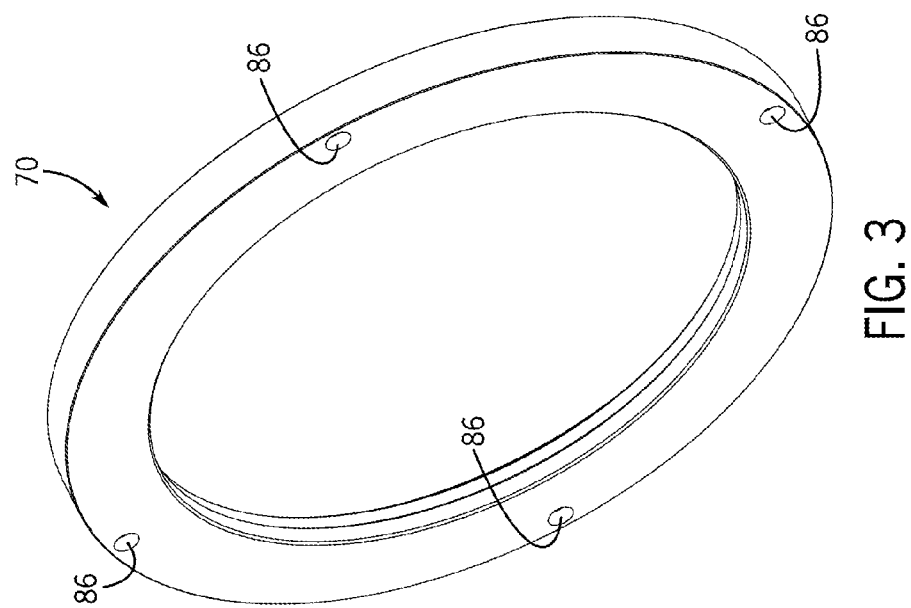
FIG. 3 is a top, front perspective view of a retaining ring of the butterfly valve of FIG. 1.
Figure 4:
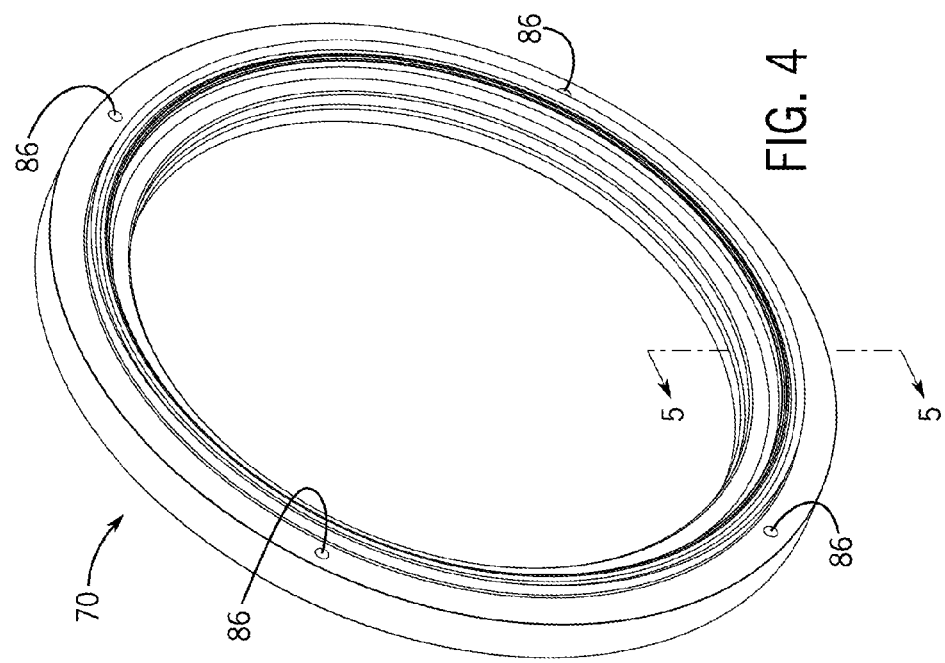
FIG. 4 is a top, rear perspective view of the retaining ring of FIG. 3.
Figure 5:
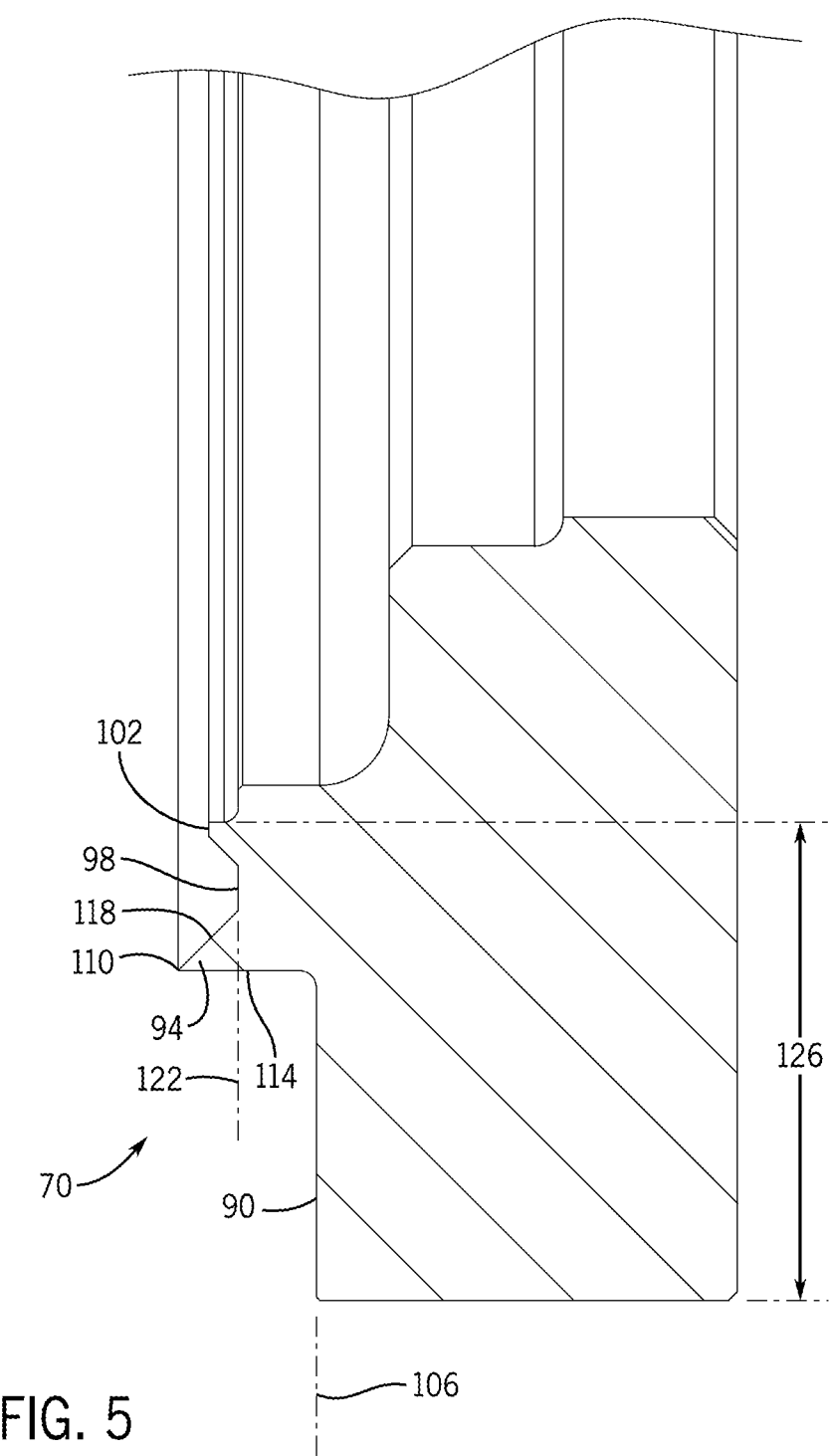
FIG. 5 is a sectional view of the retaining ring taken along the line 5-5 of FIG. 4.

As shown in FIGS. 3 and 4, the retaining ring 70 includes a plurality of counterbored through-holes 86 that are arranged to facilitate fastening the sealing assembly 66 to the body 54, however, depending on the design, these are not necessarily present. With reference to FIG. 5, the retaining ring 70 includes a primary ring gasket seat sealing surface 90, a cutter 94, a secondary ring gasket seat sealing surface 98, and a metal stop 102. The primary ring gasket seat sealing surface 90 defines a primary seat plane 106 and is substantially flat. In other embodiments, the primary ring gasket seat sealing surface 90 may define a shaped profile (e.g., a frustoconical, or curved profile). The cutter 94 is arranged between the primary ring gasket seat sealing surface 90 and the secondary ring gasket seat sealing surface 98 and may define a sharpened edge 110, a flat wall 114, and a sloped wall 118. The secondary ring gasket seat sealing surface 98 may define a secondary seat plane 122 spaced apart from the primary seat plane 106 axially along the flow axis 60. A seat width 126 is defined between the ring shoulder 102 and an outer periphery of the primary ring gasket seat sealing surface 90.

As shown in FIG. 6, the body gasket 74 is annular and may include apertures 130 arranged to align with the through-holes 86 formed in the retaining ring 70. With reference to FIG. 7, the body gasket 74 defines a gasket width 134 that is sized to be at least as wide as the seat width 126 of the retaining ring 70. The body gasket 74 also defines a gasket thickness 138.

As shown in FIG. 8, the metal seat 78 is annular and may be formed out of stamped metal. With reference to FIG. 9, the metal seat 78 includes a metal flange 142 and a metal sealing portion 146. The metal seat 78 is flexible enough to engage and disengage the disk 58 during operation of the butterfly valve 50. In one embodiment, the seat 78 is formed from metal.

As shown in FIG. 10, the soft seat 82 is annular and may be formed of a plastic or polymeric material. With reference to FIG. 11, the soft seat 82 includes a head portion 150 and a sealing surface 154 arranged to engage and disengage the disk 58 during operation of the butterfly valve 50. In one embodiment, the soft seat 82 is formed from PTFE plastic.

Figure 12:
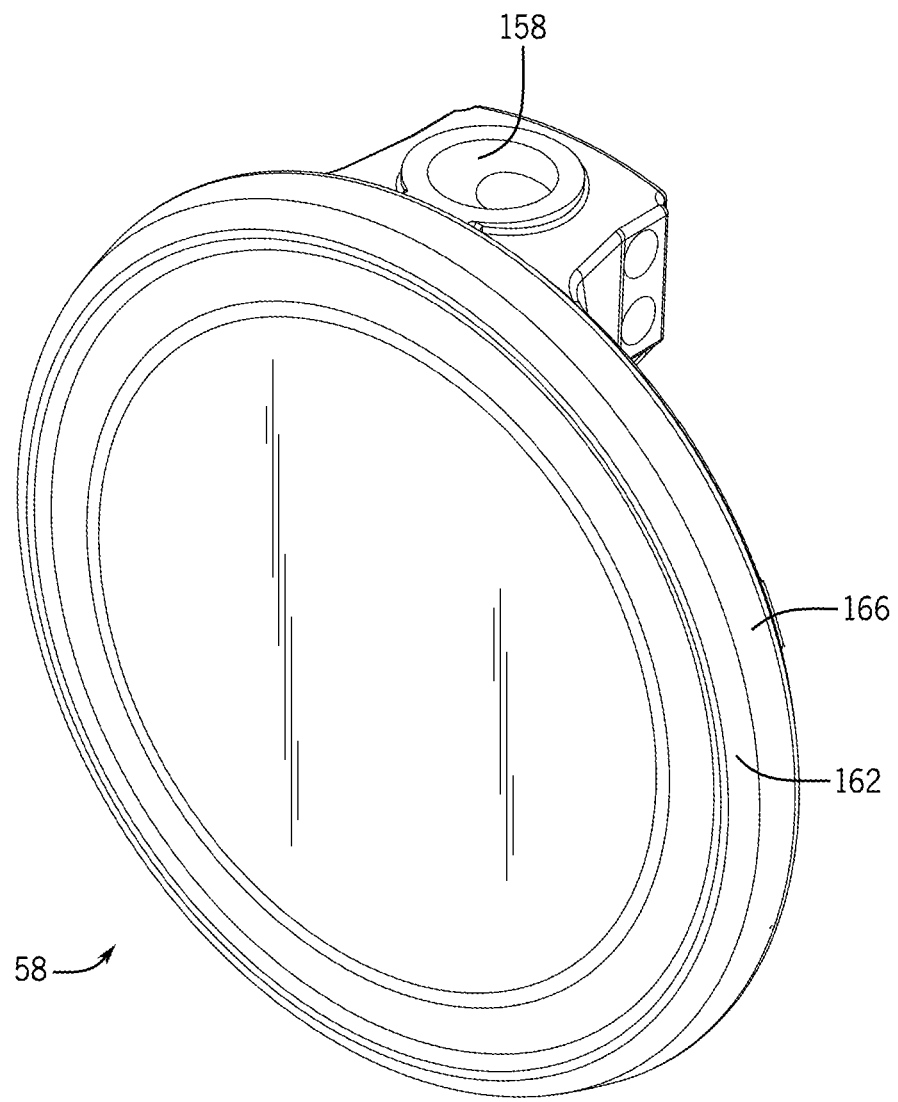
FIG. 12 is a top, front perspective view of a disk of the butterfly valve of FIG. 1.

As shown in FIG. 12, the disk 58 includes a shaft aperture 158 sized to receive the shaft 62, a metal sealing portion 162 arranged to selectively engage the metal seat 78, and a soft sealing portion 166 arranged to selectively engage the soft seat 82.

Figure 13:
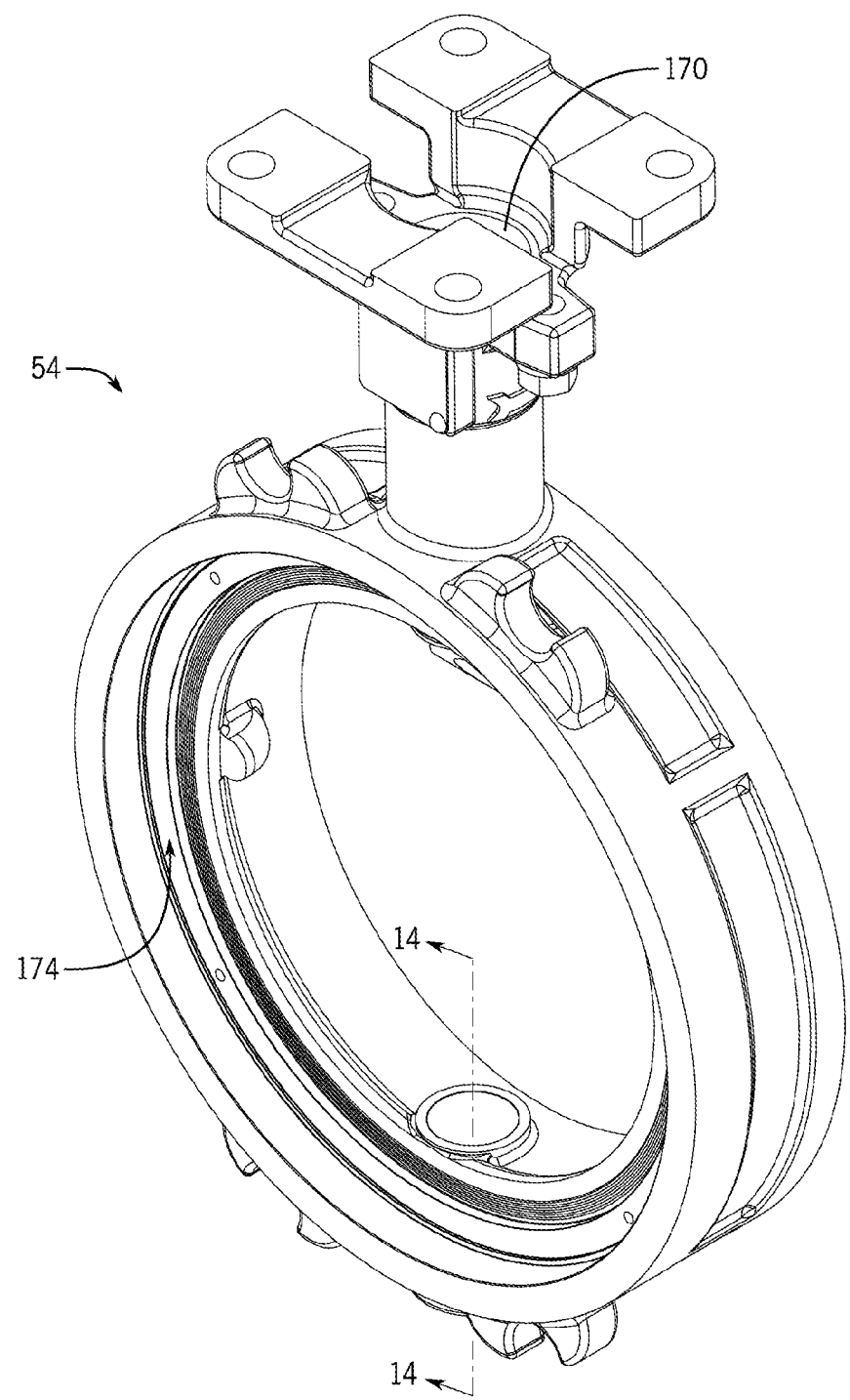
FIG. 13 is a top, front perspective view of a body of the butterfly valve of FIG. 1.
Figure 14:
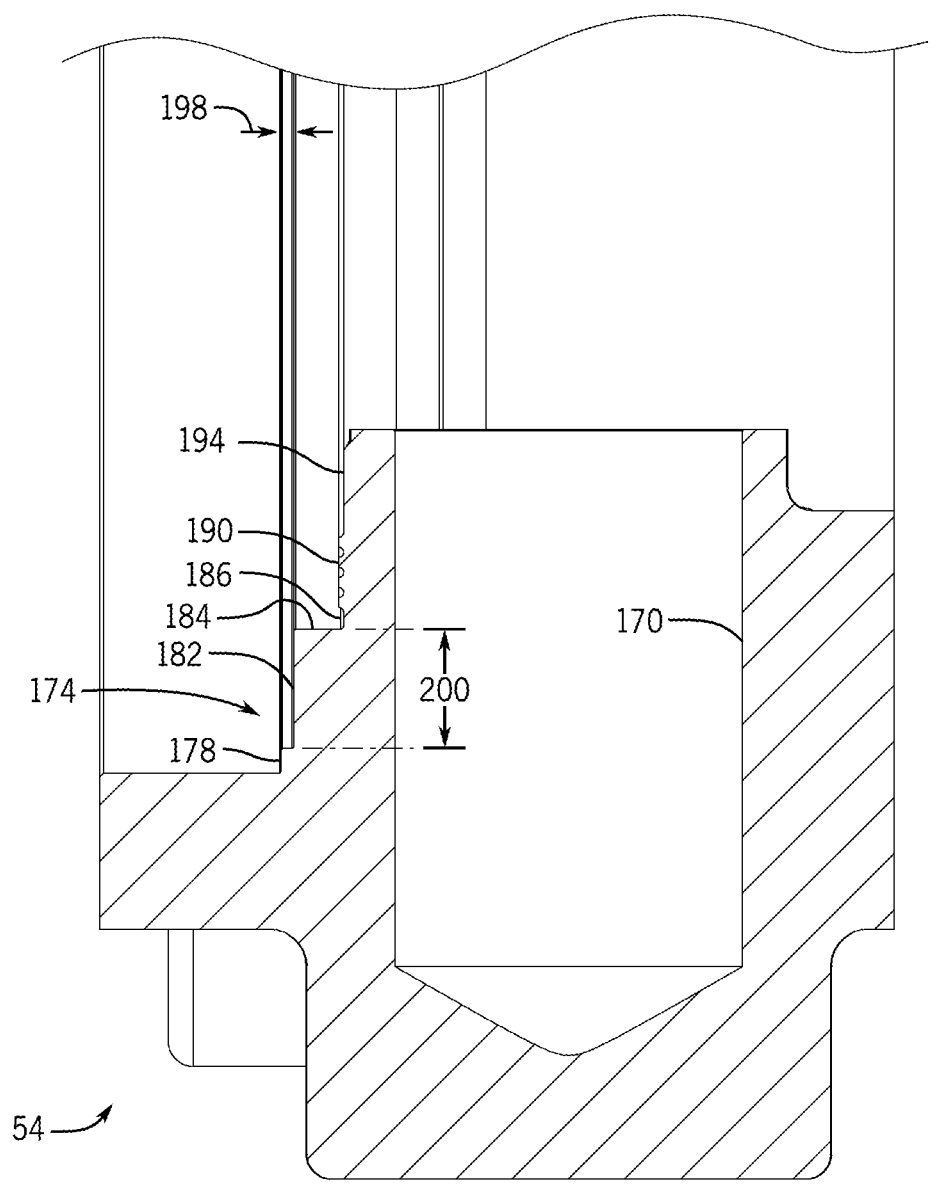
FIG. 14 is a sectional view of the body taken along line 14-14 of FIG. 13.

As shown in FIG. 13, the body 54 includes a body shaft aperture 170 sized to receive the shaft 62 and aligned with the shaft aperture 158, and further includes a seal recess 174. With reference to FIG. 14, the seal recess 174 is defined by a body shoulder 178, a primary body gasket seat 182, a shearing wall 184, an anvil surface 186, a clamping portion 190, and a soft seat portion 194. The body shoulder 178 defines a body shoulder height 198 that is sized relative to the body gasket 74 to provide a predetermined degree of compression. The primary body gasket seat 182 defines a primary body seat width 200. The anvil surface 186 defines a flat, solid surface and is arranged to interact with the cutter 94. The clamping portion 190 defines a textured surface in the form of grooves which may or may not be required for the functionality of the design.

Figure 15:
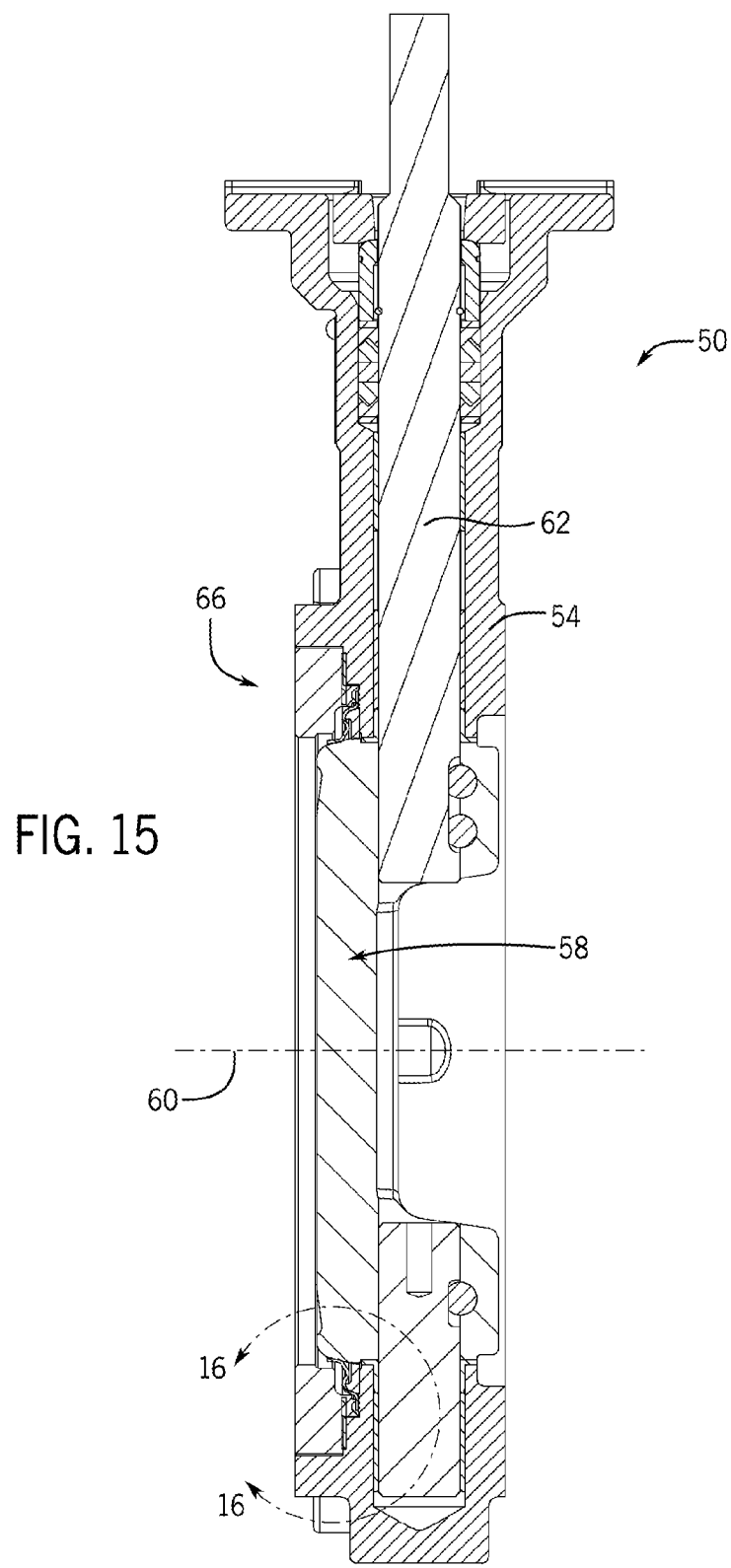
FIG. 15 is a sectional view of the butterfly valve taken along line 15-15 of FIG. 1.

As shown in FIG. 15, the assembled butterfly valve 50 inhibits fluid flow past the disk 58 when in the closed position. The shaft 62 can be actuated to move the disk 58 between the open position and the closed position.

Figure 16:
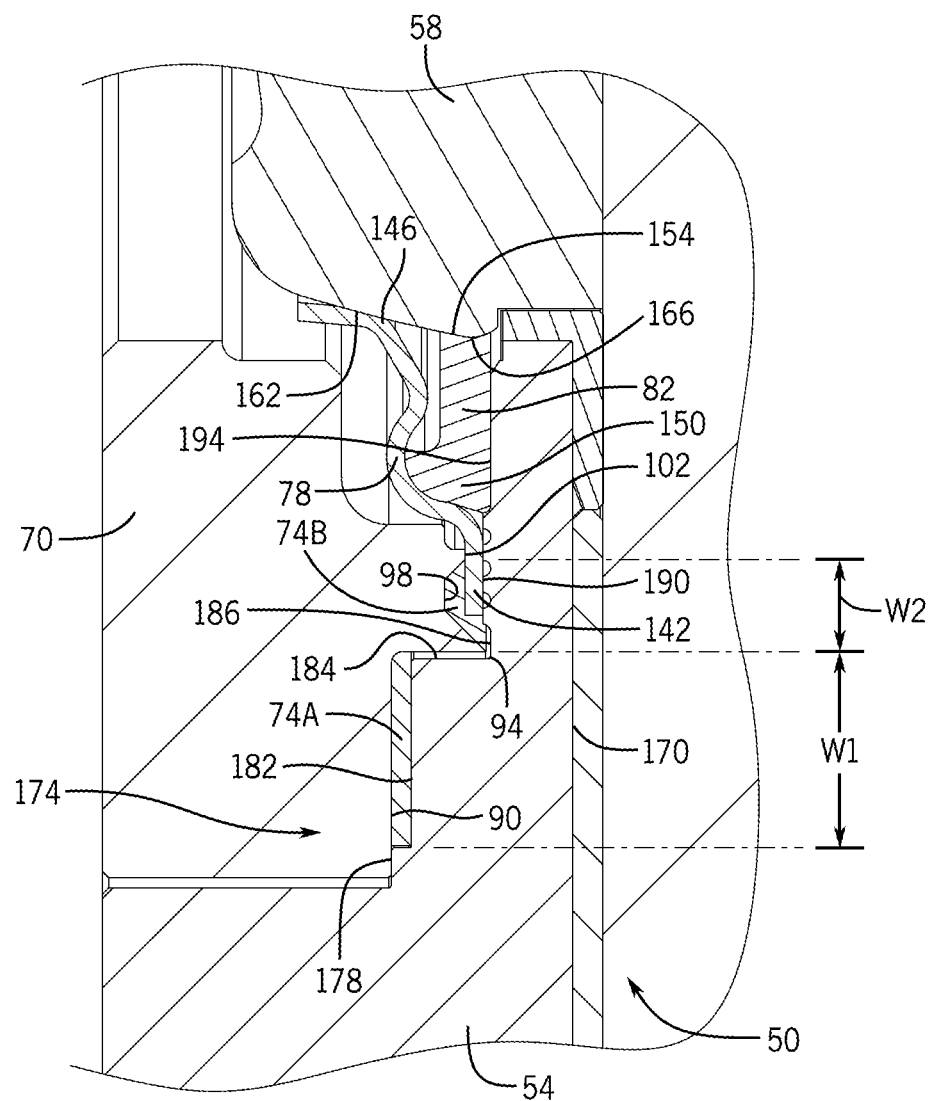
FIG. 16 is a detail view of the butterfly valve taken within circle 16-16 of FIG. 15.

FIG. 16 illustrates the assembly of the butterfly valve 50. The soft seat 82 is first placed into the seal recess 174 abutting the soft seat portion 194 of the body 54. Then, the metal seat 78 is inserted such that the metal flange 142 abuts the clamping portion 190 of the body 54 and the soft seat 82 is captured between the metal seat 78 and the soft seat portion 194. The body gasket 74 is then inserted into the seal recess 174 radially inside the body shoulder 178 as a single piece, as shown in FIG. 6. When first inserted, the body gasket 74 extends radially beyond the shearing wall 184 in an inward direction. That is to say, the gasket width 134 is larger than the primary body seat width 200, as shown in FIG. 14. With the body gasket 74 seated, the retaining ring 70 is inserted into the seal recess 174 such that the cutter 94 engages the body gasket 74 adjacent the shearing wall 184. Load is applied either via fasteners or machine resulting in the cutter 94 and the shearing wall 184 cooperating to cleanly cut the body gasket 74 into a primary portion 74A and an inner secondary portion 74B. If present, the fasteners 84 are tightened to a predetermined torque that results in the outer portions of the primary ring gasket seat sealing surface 90 of the retaining ring 70 making hard contact with the body shoulder 178. This hard contact provides a predetermined compression of the body gasket 74. Additionally, the metal ring 102 of the retaining ring 70 makes hard contact with the metal flange 142, compressing the metal flange 142 between the clamping portion 190 of the body 54 and the ring shoulder 102. When fully tightened, the primary portion 74A is compressed between the primary ring gasket seat sealing surface 90 and the primary body gasket seat 182, and the secondary portion 74B is compressed between the secondary ring gasket seat sealing surface 98, the anvil portion 186, the metal flange 142, and the metal ring 102. The secondary portion 74B is deformed during the tightening process to fill in any voids.

The arrangement of the body shoulder 178 and the ring shoulder 102 provide a predetermined compression of the body gasket 74 and inhibit overtightening/overcompression.

In some embodiments, the primary seal portion 74A may have a width W1 (FIG. 16) that is greater than a width W2 of the secondary seal portion 74B. In other embodiments, the widths W1, W2 may be the same or W1 may be less than W2. In some embodiments, the body gasket may be a non-laminated graphite gasket.

Figure 19:
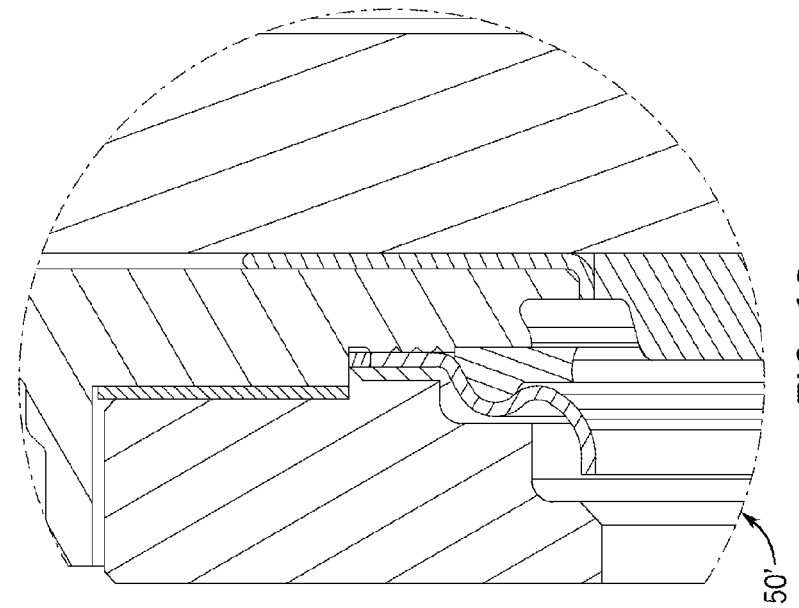
FIG. 19 is a detail view of the butterfly valve taken within circle 19-19 of FIG. 18.
Figure 18:
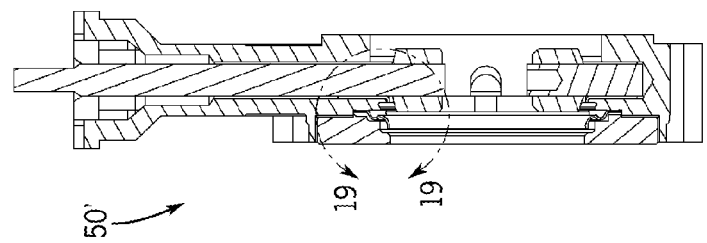
FIG. 18 is a sectional view of the butterfly valve taken along line 18-18 of FIG. 17.
Figure 17:
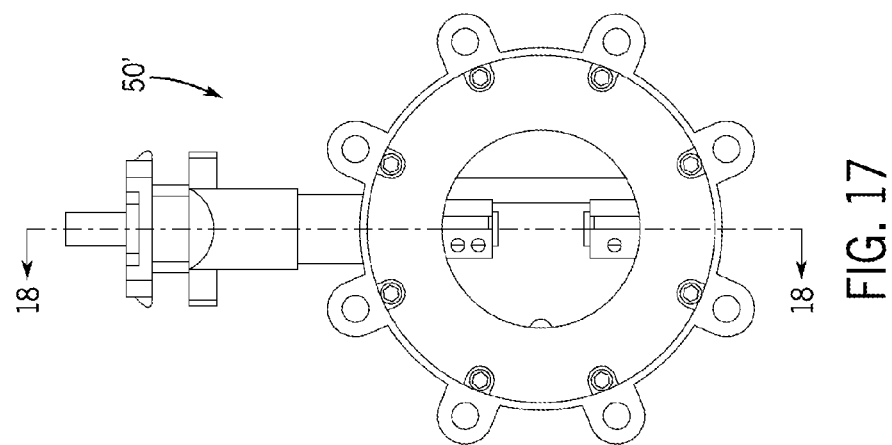
FIG. 17 is a front view of a butterfly valve according to another embodiment.

FIGS. 17-19 show another butterfly valve 50' that is similar to the butterfly valve 50 discussed above.

Figure 20:
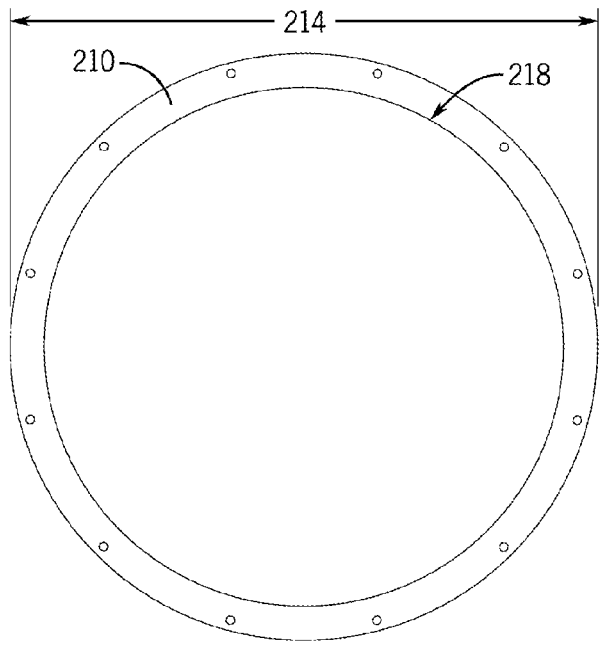
FIG. 20 is a front view of a body gasket according to another embodiment.

FIG. 20 shows a body gasket 210 that defines an outer diameter 214 of about forty inches (40") and a gasket width 218 of about two and forty-five hundredths inches (2.45"). This is a standard size for a thirty-six inch gasket.

Figure 21:
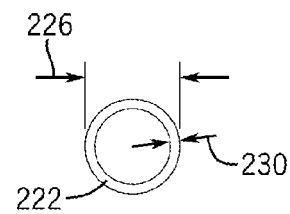
FIG. 21 is a body gasket according to yet another embodiment.

FIG. 21 shows a body gasket 222 that defines an outer diameter 226 of about six inches (6") and a gasket width 230 of about sixty-six hundredths inches (0.66"). This is a standard size for a four-inch gasket. Both of the gaskets of FIGS. 20 and 21 are examples of gaskets that may be used with the above described embodiments to provide a cut-during-installation, self-centered, two-plane body gasket.

Figure 22:
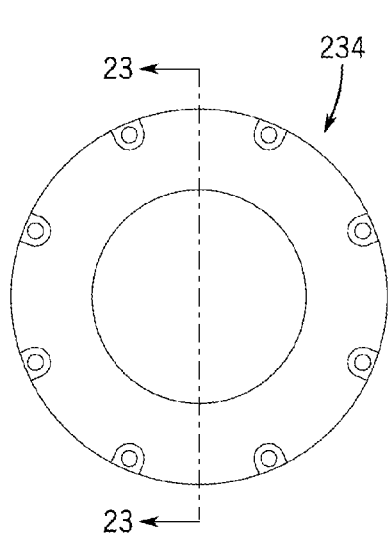
FIG. 22 is a front view of a retaining ring according to another embodiment.
Figures 23, 24:
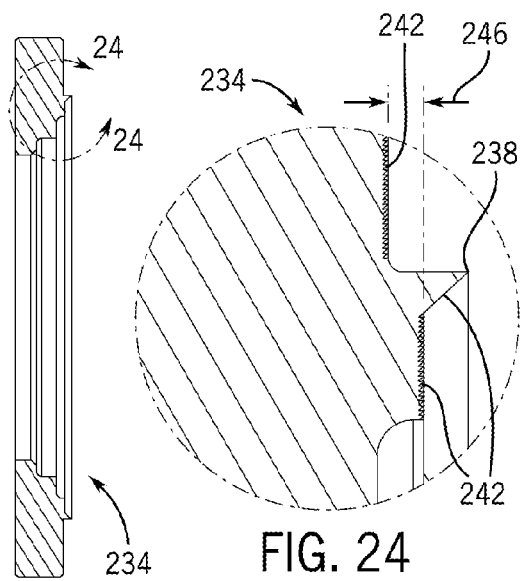
FIG. 23 is a sectional view of the retaining ring taken along line 23-23 of FIG. 22.
FIG. 24 is a detail view of the retaining ring taken within line 24-24.

FIGS. 22-24 show another retainer ring 234 that includes a cutter 238, sealing surfaces 242, and a sealing plane offset 246 of about six hundredths of an inch (0.06").

Figure 27:
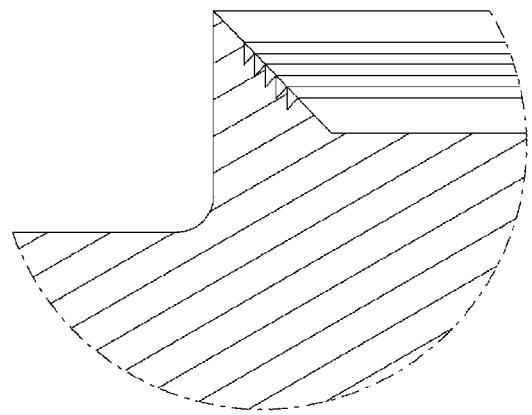
FIG. 27 is a detailed sectional view of a cutting profile applied to a retaining ring according to yet another embodiment.
Figure 26:
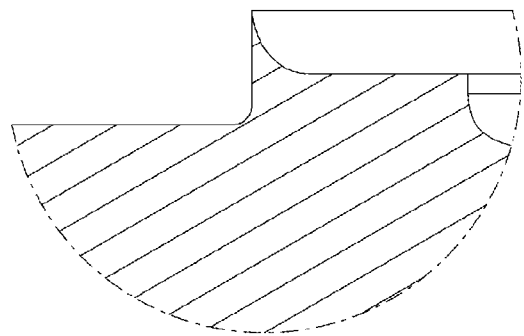
FIG. 26 is a detailed sectional view of a cutting profile applied to a retaining ring according to another embodiment.
Figure 25:
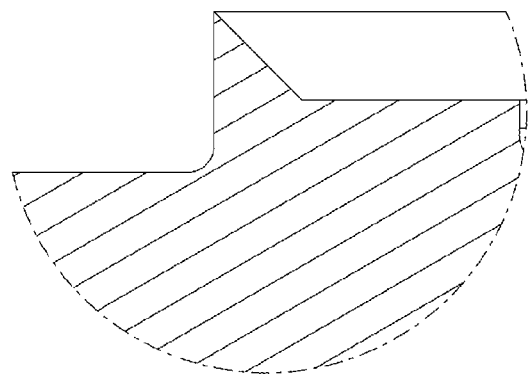
FIG. 25 is a detailed sectional view of a cutting profile of a retaining ring according to one embodiment.

FIGS. 25-27 illustrate different cutter profiles 300a, 300b, 300c that include a straight slope, a curved slope, and grooves or teeth formed in the slope, respectively. One skilled in the art will understand that any of the cutter profiles disclosed herein may be utilized with any of the embodiments described herein.

Figure 28:
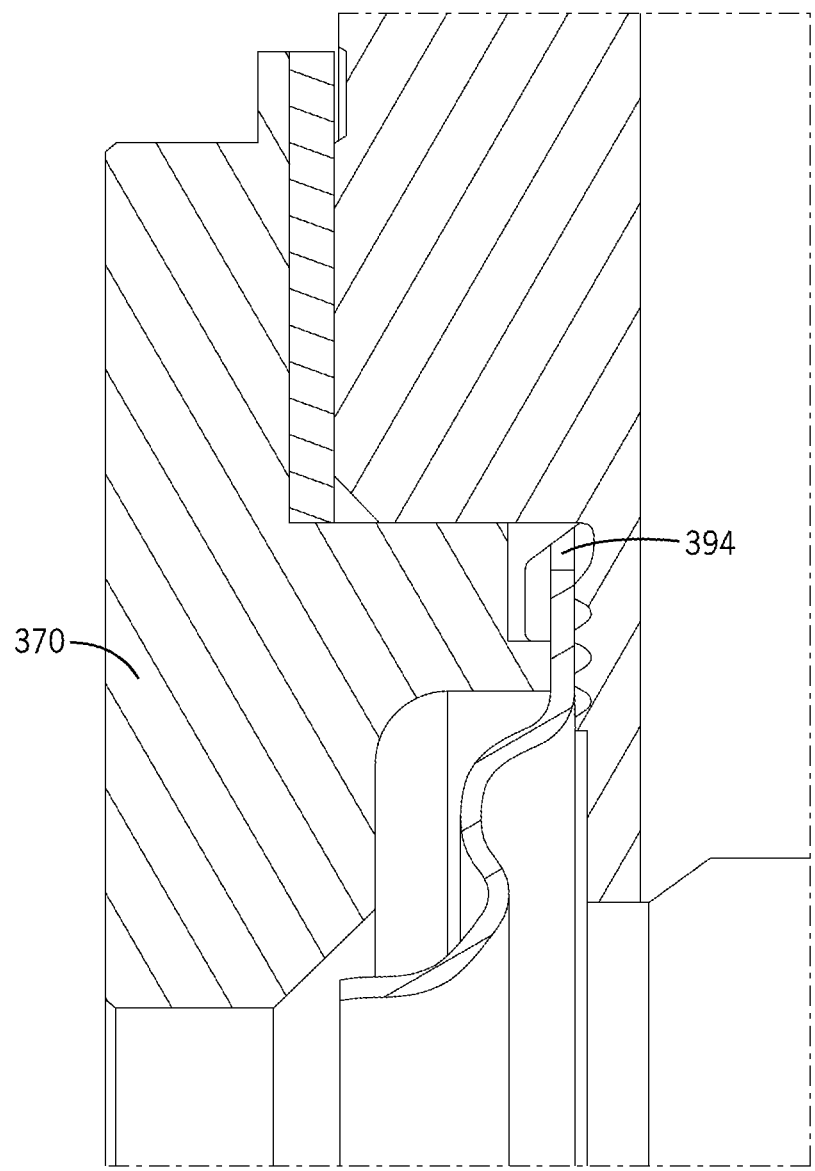
FIG. 28 is a detailed sectional view of a butterfly valve according to yet another embodiment.

FIG. 28 shows another retaining ring 370 that includes a cutter 394 that is a separate component and not formed as a part of the retaining ring 370. The assembly of FIG. 28 is assembled in the same manner as described with respect to FIG. 16 and generally includes the same components and features of FIGS. 1-16, except that the cutter is a separate component. In this manner, the cutter 394 may be placed against the retaining ring 370 or may attached to the retaining ring 370, for example, by an adhesive or any other suitable attachment mechanism.

Figure 29:
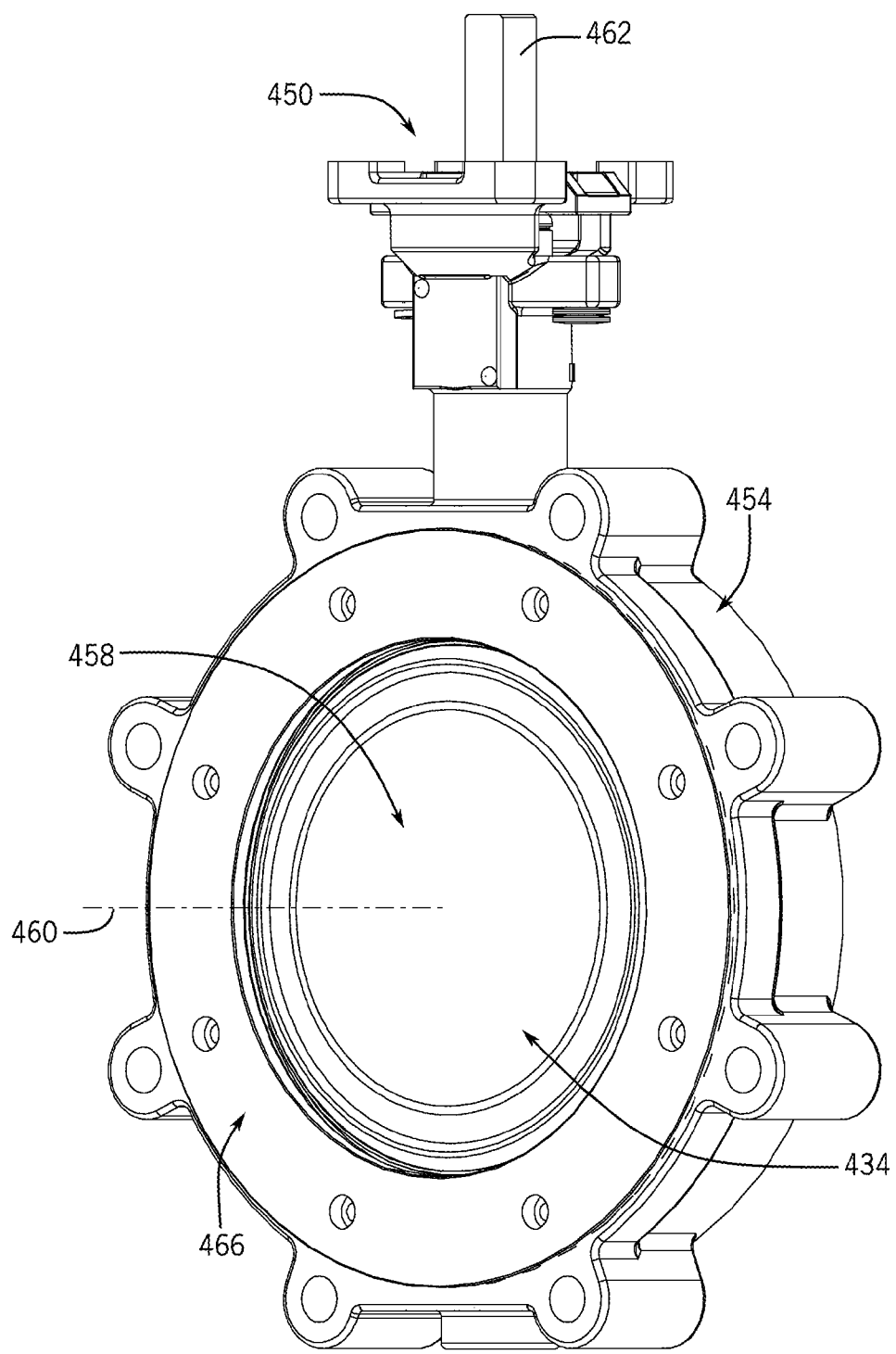
FIG. 29 is a perspective view of a butterfly valve in accordance with another embodiment of the present disclosure.

Referring to FIG. 29, a further embodiment of a butterfly valve 450 is shown. Similar to the butterfly valves shown and discussed with reference to FIGS. 1-28, the butterfly valve 450 includes a valve body 454 and a disk 458 rotatable between an open position and a closed position for selectively providing and inhibiting flow along a flow axis 460 through a central channel 434. A shaft 462 may be coupled to the disk 458, wherein the shaft 462 may be rotated relative to the valve body 454, which in turn causes the disk 458 to rotate between the closed and open positions, thereby controlling the flow of fluid through the central channel 434 of the butterfly valve 450. A sealing assembly 466 inhibits flow when the disk 458 is in the closed position, and also restricts leakage outward from the butterfly valve body 454.

Figure 30:
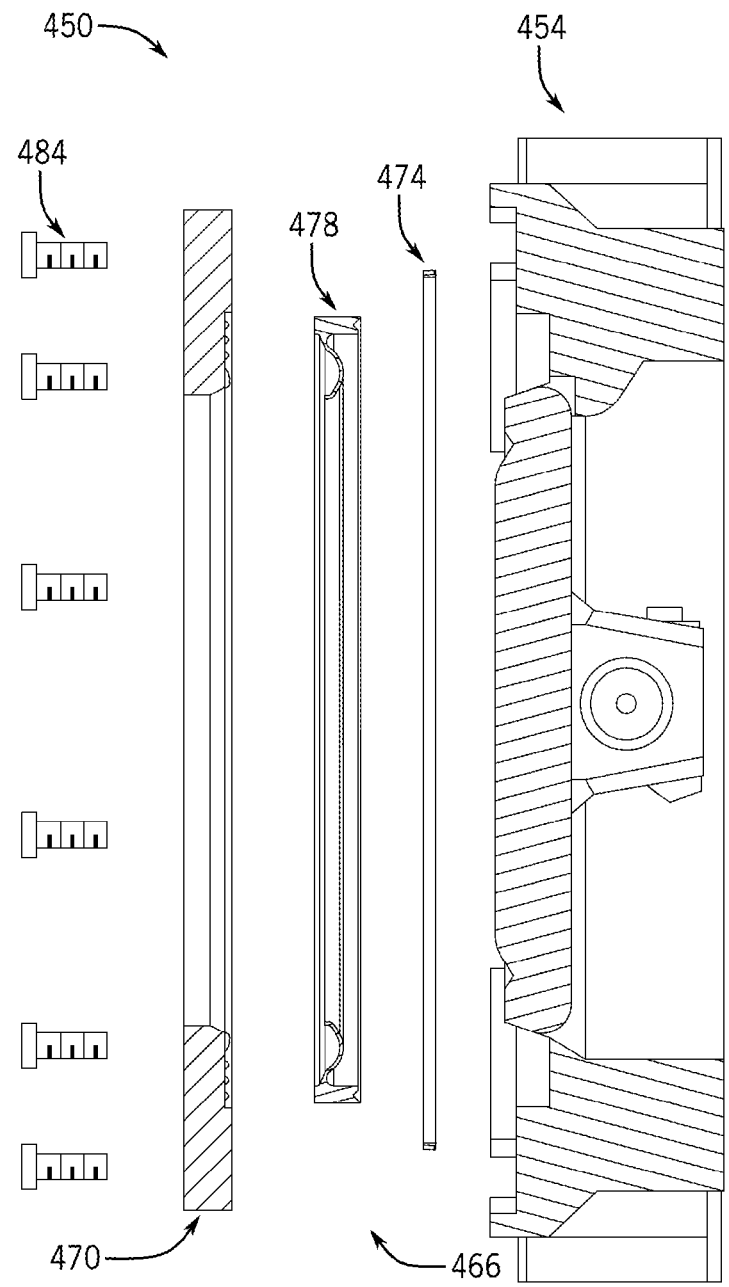
FIG. 30 is an exploded view of the butterfly valve of FIG. 29.

Referring now to FIG. 30, the sealing assembly 466 is shown in greater detail. In some embodiments, the valve body 454 of butterfly valve 450 is configured to receive a gasket 474, which can be used to provide sealing on multiple surfaces. In some embodiments, this gasket may comprise a noncombustible material, such as graphite. As will be explained in further detail below, the gasket 474 may be provided with a brittle material that allows the gasket 474 to be severed into a plurality of different gaskets (not shown), which may allow gasket 474 sealing on at least two surfaces (e.g., two surfaces that are spaced apart along the flow axis 460). The body 454 can be provided with a plurality of mating surfaces that may be configured to receive the gasket 474 to provide sealing between the valve body 454, the cutter seat 478, and a seat retaining ring 470.

In some embodiments, the butterfly valve 450 includes a cutter seat 478, which may be separate and distinct from the seat retaining ring 470. Similar to the metal seat 78 discussed above in FIG. 9, the cutter seat 478 may be formed of a suitable metal (e.g. 304 stainless steel, 316 stainless steel, aluminum, or another suitable material or materials) and may include a flange 448 and a sealing portion 446 (shown in FIG. 31C), as discussed in more detail below. By including a cutter seat 478 separate from the seat retaining ring 470, a standardized seat retaining ring 470 may be used in the butterfly valve 450 that may allow one universal seat retaining ring 470 design to be used across multiple different butterfly valve 450 applications. For example, the same seat retaining ring 470 may be used in low-temperature applications that may not require "firesafe" sealing. The design of the seat retaining ring 470 may allow the butterfly valve 450 to utilize elastomeric, polymeric, or other suitable gasket materials to provide sealing within the butterfly valve 450. In some embodiments, a plurality of fasteners 484 are used to couple the sealing assembly 466 to the valve body 454. Fasteners 484 may be configured to extend through counterbored holes in the seat retaining ring 470, and thread into holes present in the valve body 454. In some embodiments, the fasteners 484 compress the seat retaining ring 470, the cutter seat 478, the gasket 474, and the valve body 454 together, such that a substantially leak-free seal is formed between the components. It should be appreciated, however, that many other types of fasteners may be used to fasten the sealing assembly 466 to the valve body 454, such as any of the fasteners discussed above with reference to FIGS. 1 and 2, for example.

Figure 31A:
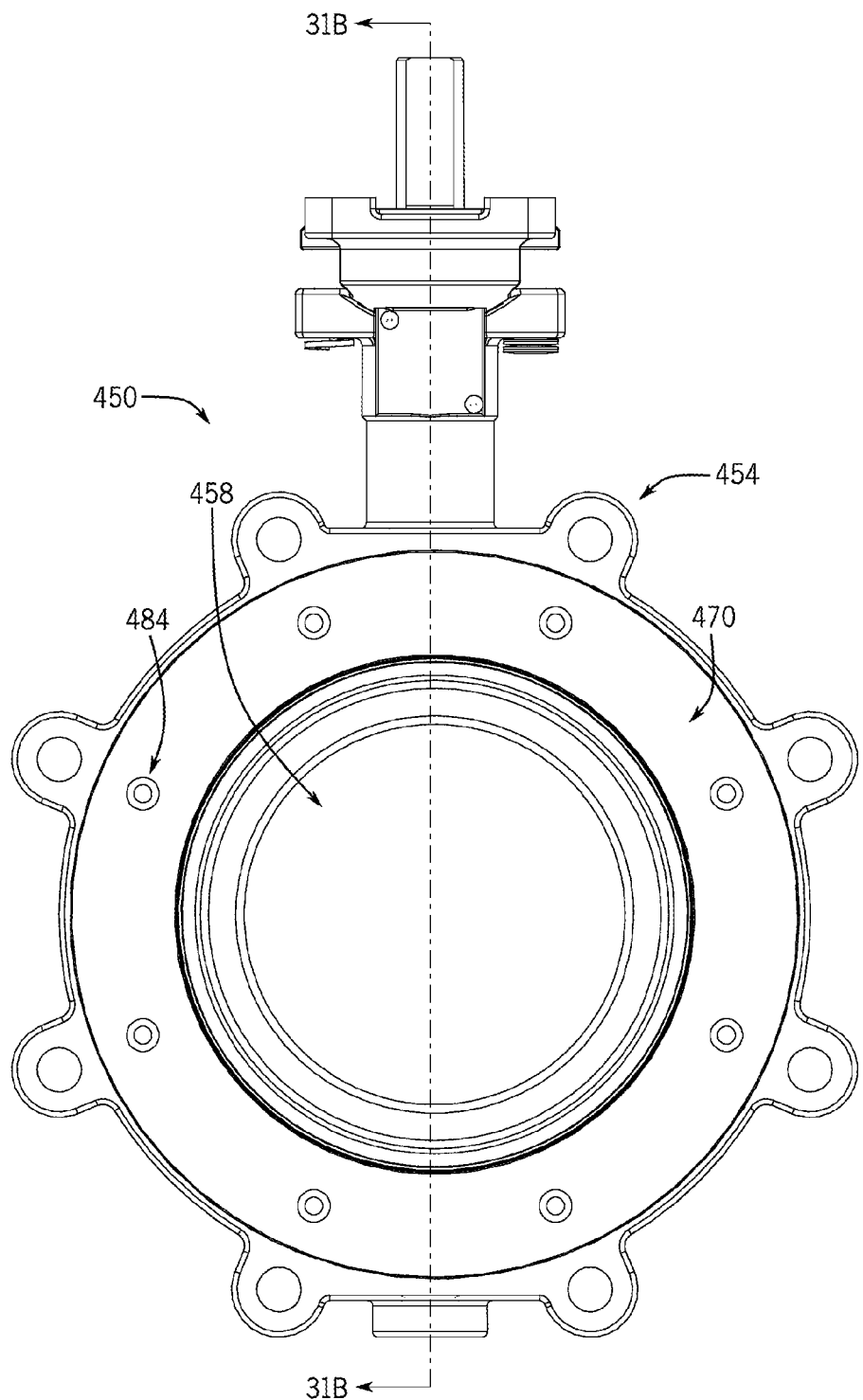
FIG. 31A is a front view of the butterfly valve of FIG. 29.
Figure 31B:
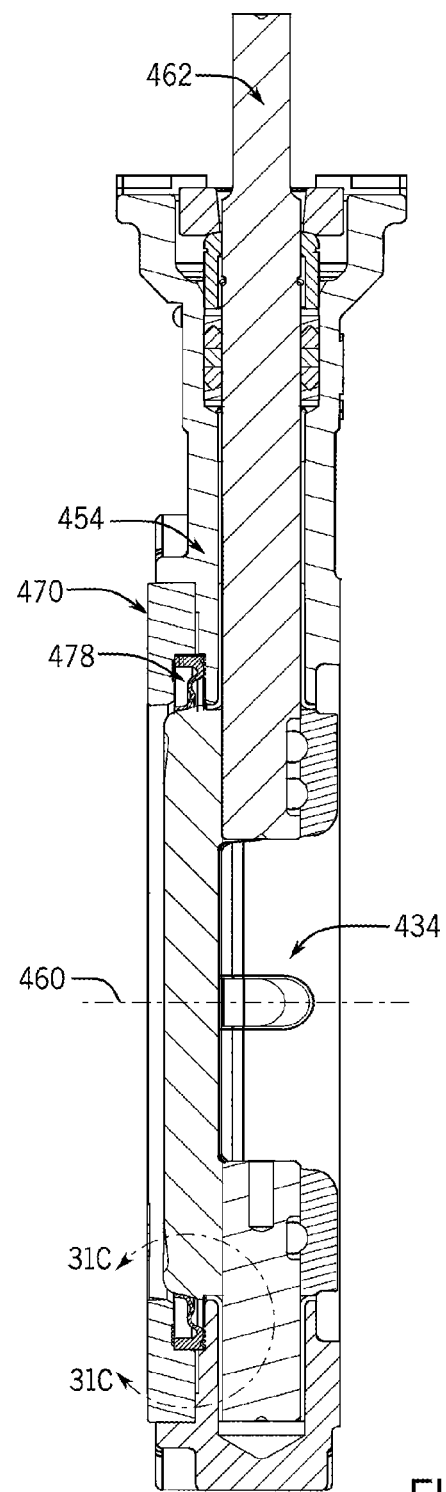
FIG. 31B is a cross-sectional view of the butterfly valve of FIG. 29 taken along lines 31B-31B in FIG. 31A.
Figure 31C:
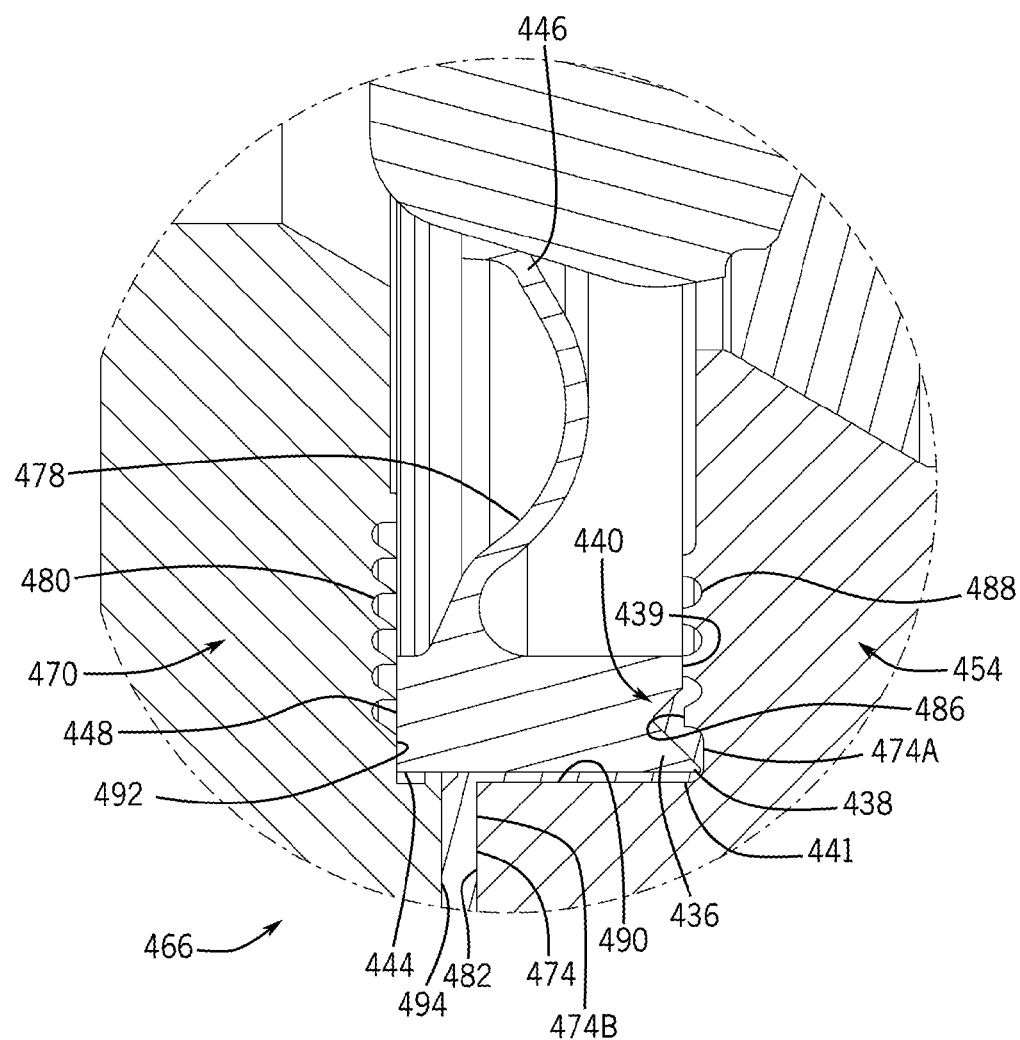
FIG. 31C is a detailed sectional view of a sealing assembly of the butterfly valve of FIG. 29 taken along circular section 31C in FIG. 31B.

With further reference to FIGS. 31B and 31C, the mating of sealing surfaces in the sealing assembly 466 is shown in greater detail. In order to better understand the functionality of components in the butterfly valve 450, a method of installing the components of the sealing assembly 466 will be described. In some embodiments, valve body 454 is provided with a plurality of mating surfaces 482, 486, which are adapted to form compressive contact between one or more components. The mating surfaces 482, 486 may be substantially flat surfaces, and may also include a plurality of grooves 488. In some embodiments, the grooves 488 are provided to restrict fluid from moving outward away from the mating surfaces 482, 486 towards an external environment, such as an outer surface of butterfly valve 450. The grooves 488 may also be a retaining feature, and can be designed to engage and restrict movement of a soft seat that may be present in some embodiments of the butterfly valve 450 which are adapted for lower temperature applications.

In some embodiments, the valve body 454 is provided with a substantially cylindrical bore 490 that is configured to at least partially receive one or more additional sealing components, such as the gasket 474 and/or the cutter seat 478. In some embodiments, the cylindrical bore 490 is defined by a radius that is sized to be slightly larger (e.g. between about 0.05 mm and about 10 mm) than a radius defining an outer surface 444 of the cutter seat 478, such that a tight clearance fit can be created between the cylindrical bore 490 and the outer surface 444 of the cutter seat 478. In other embodiments, the radius defining the cylindrical bore 490 is chosen to be approximately equal in length to the radius defining the outer surface 444 of the cutter seat 478, such that an interference fit can be created between the outer surface 444 of the cutter seat 478 and the cylindrical bore 490 of the valve body 454.

As indicated above with reference to FIGS. 29-30, the gasket 474 may be present in the sealing assembly 466. In some embodiments, the gasket 474 comprises a brittle material such as graphite or carbon fiber. The gasket 474 may be provided with an annular shape, such as that described with reference to body gasket 74 in FIGS. 6 and 7. In some embodiments, the gasket 474 is designed to sit upon the mating surface 482 of the valve body 454 during installation in the butterfly valve 450. The mating surface 482 may be sized and shaped to help locate the gasket 474 within the proper location relative to valve body 454 during installation. For example, the mating surface 482 may be partially defined by an outer radius (not shown) that is slightly larger in size than the radius defining the outer surface of gasket 474 (e.g. between about 0.05 mm and about 10 mm). By providing a small clearance between the outer surface of the gasket 474 and the outer boundary of the mating surface 482, the gasket 474 can be appropriately positioned substantially concentrically with the central channel 434 extending through valve body 454. In some embodiments, the inner radius of the gasket 474 is defined by a radius that is smaller than the radius defining the cylindrical bore 490 of the valve body 454, such that a portion of the gasket 474 extends radially inward from and covers a portion of the cylindrical bore 490 when the gasket 474 is seated on the mating surface 482, prior to installation of the cutter seat 478. As discussed below, this allows the gasket 474 to be severed into a plurality of sub-gaskets 474A, 474B and provides sealing on multiple mating surfaces 482, 486 once the cutter seat 478 and the seat retaining ring 470 are installed.

The gasket 474 may comprise a brittle material that can be configured to shear into a plurality of different sub-gaskets 474A, 474B when a sufficient compressive force is applied to a surface of the gasket 474. These sub-gaskets 474A, 474B may then be used to seal multiple different surfaces in the butterfly valve 450, which may be particularly advantageous in some applications.

In some embodiments of the assembly and installation process of the sealing components 466 into butterfly valve 450, the gasket 474 is first placed onto the mating surface 482 of the valve body 454. As indicated previously, the size and shape of the gasket 474 and the mating surface 482 allow the gasket 474 to be easily positioned in a proper location relative to the valve body 454 (i.e. substantially concentric with the central channel 434 of the valve body 454). As discussed earlier, a portion of the gasket 474 may then extend inwardly over a portion of the cylindrical bore 490 of the valve body 454. A cutter seat 478 may then be urged into the cylindrical bore 490 of the valve body 454. If the gasket 474 comprises a brittle material, the gasket 474 will shear along an area between the outer surface of the cutter seat 444 and the surface of the cylindrical bore 490, such that gasket 474 is split into at least two sub-gaskets 474A, 474B capable of sealing two different surfaces. For example, the sub-gasket 474A may be configured to provide a seal between the cutter seat 478 and the valve body 454, while the sub-gasket 474B may be configured to provide a seal between valve body 454 and seat retaining ring 470.

To improve the shearing process of the gasket 474, the cutter seat 478 may be provided with a cutter 436 that defines a sharpened edge 438 designed to produce a shearing plane corresponding to the outer surface 444 of the cutter seat 478. In some embodiments, the cutter 436 extends forwardly beyond a flat mating surface 439 of the cutter seat 478. Accordingly, when the cutter seat 478 is assembled into place (after the gasket 474 has been positioned properly relative to valve body 454), the first point of contact between the cutter seat 478 and the gasket 474 occurs at sharpened edge 438. As the cutter seat 478 is urged further into the cylindrical bore 490 of valve body 454, the sharpened edge 438 projects a concentrated force to the gasket 474 along the point of contact between sharpened edge 438 and the gasket 474. Because a portion of the gasket 474 extends inwardly over the cylindrical bore 490 of the valve body 454, this concentrated force is unopposed by the valve body 454, and causes the gasket 474 to shear cleanly along a plane defined by the sharpened edge 438 and the outer surface 444 of the cutter seat 478.

In order to produce a seal between the cutter seat 478 and the valve body 454, a number of different features may be utilized. For example, valve body 454 may be provided with a channel 441 that extends into the mating surface 486 of the valve body 454 to accommodate the tooth-like shape of the cutter 436. In some embodiments, the cutter 436 is provided with a gasket trap 440 designed to produce compressive engagement between the gasket 474, the cutter seat 478, and the valve body 454. As the gasket 474 is being sheared, the gasket trap 440 is designed to restrict radial movement of the gasket 474 relative to the cutter seat 478 by capturing the gasket 474 within its two angled surfaces. In some embodiments, the angled surfaces of the gasket trap 440 form an angle of between about 10° and about 170°, or between about 30° and about 150°, or between about 60° and about 120°. In some embodiments, the angled surfaces of the gasket trap 440 form an angle of about 90°.

The shape and location of the one or more grooves 488 on mating surface 486 of the valve body 454 may be positioned to further manipulate the shape of gasket 474 once it has been sheared into the sub-gaskets 474A, 474B. For example, the one or more grooves 488 may be offset such that the mating surface 486 of the valve body 454 extends at least partially into the gasket trap 440, as shown in FIGS. 31B and 31C. If the gasket 474 comprises a brittle material, the gasket 474 may be readily deformed by the geometry of the gasket trap 440 and the grooves 488 to produce an effective seal between the cutter seat 478 and the valve body 454. The orientation of grooves 488 and the gasket trap 440 may extrude the sub-gasket 474A into a "V-shape" when the sub-gasket 474A is compressed, which may result in a desirable sealing arrangement. Because gaskets are generally required to attain a certain minimum level of sealing stress to produce a proper seal, the shape of the gasket trap 440 and the location of grooves 488 may be chosen to provide an optimal "calculated gasket sealing area," which can then be used to determine how much gasket material 474 should extend inward over cylindrical bore 490 of the valve body 454 prior to completing the installation process. For example, the sealing area between the cutter seat 478 and the cross-sectional area between the gasket trap 440 and the mating surface 486 (and channel 441 and grooves 488, if present) may be calculated exactly. With the cross-sectional area calculated, the size of the gasket 474 (e.g., the inner diameter of the gasket and profile of the gasket 474, which becomes the sub-gasket 474A when cut) needed to produce the necessary gasket 474 compression can be calculated. Accordingly, a gasket 474 can be appropriately sized to experience an adequate sealing stress between the cutter seat 478 and valve body 454, while avoiding excess material waste.

When the butterfly valve 450 is fully assembled, the flat mating surface 439 may compressively engage the valve body mating surface 486, while the cutter 436 may engage a surface of the channel 441. In some embodiments, the flat mating surface 439 may also compressively engage a portion of the sub-gasket 474A. Similarly, the cutter 436 may engage a portion of the sub-gasket 474A. In some embodiments, the sub-gasket 474A may be substantially contained between the cutter 436, the gasket trap 440, and the mating surface 486 of the valve body 454.

Once the cutter seat 478 is placed into compressive engagement with the gasket 474 and the valve body 454, the seat retaining ring 470 may be assembled into place. In some embodiments, seat retaining ring 470 comprises a flat mounting surface 492 configured to engage a surface of cutter seat 478. In some embodiments, the cutter seat 478 is provided with a flange 448 that is configured to make flat, compressive contact with the mounting surface 492 of seat retaining ring 470. In some embodiments, a seat retaining ring mounting surface 492 comprises a plurality of grooves 480, which may be present to inhibit fluid flow outward from the butterfly valve 450 to the external environment. The seat retaining ring 470 may also be provided with a second mounting surface 494 configured to compressively engage the mounting surface 482 of the valve body 454. Once the gasket 474 has been sheared into the sub-gaskets 474A, 474B, a second mounting surface 494 may be used to provide a second valve seal between the valve body 454 and the sealing assembly 466. The second mounting surface 494 of the seat retaining ring 470 may engage the sub-gasket 474B, as well as the mating surface 482 of the valve body 454. Using fasteners 484 (shown in FIG. 30), the seat retaining ring 470 may then be fastened to the valve body 454. In some embodiments, the fasteners 484 are chosen to maintain a near-constant compressive loading between the valve body 454, the sub-gaskets 474A, 474B, the cutter seat 478, and the seat retaining ring 470, such that adequate gasket stress is applied to the sub-gaskets 474A, 474B and a substantially leak-free seal is formed between the sealing components on multiple planes.

Figure 32A:
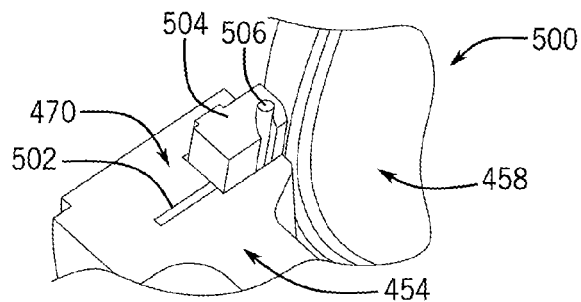
FIG. 32A is a perspective section view of the sealing assembly utilized in a butterfly valve according to another embodiment of the present disclosure.

Referring now to FIGS. 32A-32D, an array of different butterfly valve sealing assemblies are shown, all of which may be compatible with valve components described in one or more of the embodiments discussed above. For example, FIG. 32A shows a butterfly valve assembly 500 that may be used in lower temperature applications. As can be seen in the figure provided, the standard valve body 454 and seat retaining ring 470 from the butterfly valve 450 described above may be used in this assembly, which may serve to greatly reduce the number of components required for manufacturing across different product lines. A seat 504 is provided between valve body 454 and seat retaining ring 470, which serves both as a seal between the two components, as well as a seal for the valve disk 458 and the valve assembly 500. In some embodiments, the seat 504 comprises a polymeric material. In order to aid in the resiliency of the seat 504 to provide proper sealing between the seat 504 and the disk 458, an energizer 506 may be introduced within a cavity in the seat. For example, the energizer 506 may comprise a garter spring, which stores energy when the seat 504 is partially compressed during opening or closing of the valve 500. The energy stored by the energizer 506 may then be released to return the seat 504 to its desired shape. One or more gaskets 502 may be used to provide a seal between the valve body 454 and the seat retaining ring 470 by being compressed between these components. In some embodiments, the one or more gaskets 502 comprise an elastomeric material. It should be appreciated, however, that non-metallic, semi-metallic, and metallic gaskets may all be used in embodiments of the present disclosure and are similarly suitable for use.

Figure 32B:
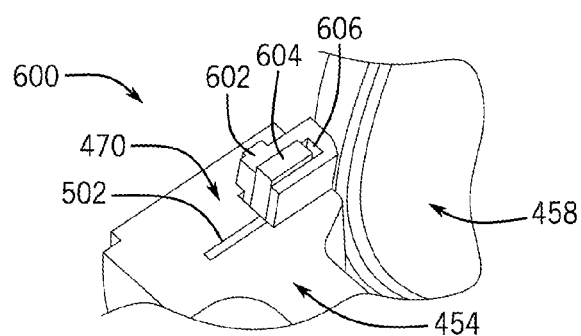
FIG. 32B is a perspective section view of the sealing assembly utilized in another embodiment of the present disclosure.

In butterfly valve 600 shown in FIG. 32B, a different seat 602 is used with the standard valve body 454 and the seat retaining ring 470, which may comprise a heavy duty polymer such as polyurethane, polypropylene, polytetrafluoroethylene (PTFE), or other suitable materials. The seat 602 may include a recess that is adapted to receive a backing ring 604 and wire wrapping 606. The backing ring 604 and wire wrapping 606 provide additional compressive support to the seat 602 when the seat 602 is compressed between the valve body 454 and the seat retaining ring 470, and helps the seat 602 maintain a seal with the disk 458 when the butterfly valve 600 is closed. The gasket 502 may also be used in this assembly, and can once again be used to establish a seal between the seat retaining ring 470 and the valve body 454 when placed under compression by these components.

Figure 32C:
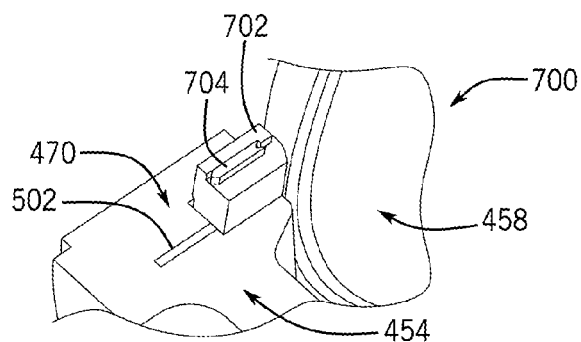
FIG. 32C is a perspective section view of the sealing assembly utilized in another embodiment of the present disclosure.

FIG. 32C shows another a butterfly valve 700 that may be assembled using like components as the embodiments of FIGS. 32A and 32B. Seals are formed between the seat retaining ring 470 and the valve body 454 by compressing a seat 702 and the gasket 502 between seat the retaining ring 470 and the valve body 454. In some embodiments, the seat 702 comprises an elastomeric material such as nitrile rubber. In other embodiments, the seat 702 may include other suitably resilient materials that allow for adequate sealing of the seat 702 between the valve body 454 and the seat retaining ring 470. A stainless steel V-ring 704 may be received within at least a portion of the seat 702 that serves to reinforce the seat 702 when it is compressed, such that adequate sealing between the disk 458 and the seat 702 can be achieved.

Figure 32D:
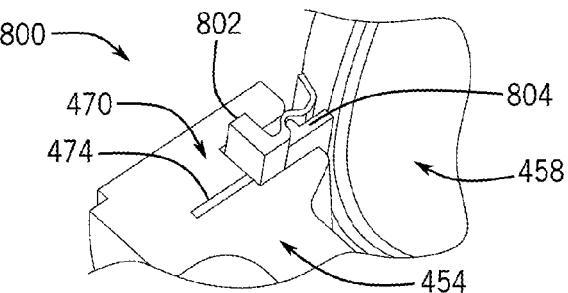
FIG. 32D is a perspective section view of the sealing assembly utilized in yet another embodiment of the present disclosure.

Referring now to FIG. 32D, yet another butterfly valve 800 is provided. Similar to the butterfly valve 450 described previously with reference to FIGS. 29-31, the butterfly valve 800 comprises a cutter seat 802, which can be used to shear a gasket 474 into a plurality of smaller gaskets to seal multiple different surfaces. The gasket 474 is once again provided to seal the surfaces between the seat retaining ring 470 and the valve body 454, as well as the surface between the cutter seat 802 and the valve body 454. The cutter seat 802 may comprise metal, and may be provided with a shape similar to the shape described above with reference to the cutter seat 478. The butterfly valve 800 may further comprise a soft seat 804, which may serve as an additional seat between the disk 458 and the valve body 454. In some embodiments, the soft seat 804 is comprised of reinforced tetrafluoroethylene (RTFE) or other suitably strong and abrasion resistant to accommodate high pressure and high temperature applications. For example, some non-limiting examples of the butterfly valve 800 may incorporate a reinforced polytetrafluoroethylene (RPTFE) soft seat 804. The soft seat 804 may comprise a similar shape and material as the soft seat 82, described with reference to FIGS. 1-28.

In traditional manufacturing methods, multiple gaskets are cut to size and then installed into the valve. As a valve increases in size, a critical ratio in gasket design is reached of outer diameter versus width of the seat retaining ring seal. Large gaskets also become too delicate to manufacture and install. A traditional solution is to add a metal sleeve to increase gasket strength. These prior solutions are rendered unnecessary by the above embodiments.

Some embodiments of the invention allow for the insertion of sealing media into difficult sealing areas where small surface areas and large diameters make traditional gasket construction difficult or impossible. Some embodiments of the invention allow for large outside diameter gaskets with relatively small cross-sectional area sealing surfaces. The cutter acts as a shearing device on the gasket media during valve assembly.

Some embodiments of the invention allow a distinct commercial advantage by removing a manufacturing process. Some embodiments of the invention increase the sealing surface area by allowing for sealing on multiple planes from a single body gasket. Some embodiments of the invention eliminate the need for additional support material in large size valve gaskets. The cutter self-centers the body gasket during assembly. Some embodiments of the invention allow gasket material to be pulled from a single "roll" for assembly.

It should be appreciated that while various cutting edges have been described that are capable of producing multiple sub-gaskets from a single generic gasket, other techniques for incorporating a cutting edge into a butterfly valve assembly are similarly contemplated, and should be considered to be within the scope of the present disclosure. For example, in some embodiments of the present disclosure, a metal cutter seat and seat retaining ring may be combined into a single component that can be installed onto a gasket and valve body. In other embodiments, additive or subtractive manufacturing techniques may be utilized to incorporate the valve body, the seat retaining ring, and the metal seat all into one single component. Such a configuration may allow for improved field assembly times. Additionally, it should be appreciated that more than two sub-gaskets may be created within a butterfly valve, and that more than one cutting edge may be utilized in the same butterfly valve.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. Further, those skilled in the art will understand that any features of any of the embodiments disclosed herein may be utilized with any of the embodiments described herein, thereby providing varying embodiments. The entire disclosure of each patent and publication cited herein is incorporated by reference, as if each such patent or publication were individually incorporated by reference herein.

The seal assemblies of the present invention are designed for in-situ sizing where gasket material of a generic size can be used and specific dimensions required for sealing of the valve may be developed (e.g., by cutting) during installation.

Various features and advantages of the invention are set forth in the following claims.

The invention claimed is:

1. A valve comprising:
   a body having a channel extending there through and a first sealing surface and a second sealing surface each positioned radially outward from the channel and offset from one another, wherein the offset between the first sealing surface and the second sealing surface defines a bore;
   a valve element positioned within the channel and configured to selectively inhibit flow through the body;
   a gasket abutting a portion of the first sealing surface and a portion of the second sealing surface;
   a cutter seat at least partially received within the bore and configured to compressively engage the second sealing surface, the cutter seat comprising a cutter that is configured to create a first sub-gasket and a second sub-gasket by severing the gasket during installation; and
   a retaining ring coupled to the valve body, the retaining ring comprising a first mating surface and a second mating surface, the first mating surface being configured to compressively engage the first sub-gasket and the first sealing surface of the body and the second mating surface being configured to compressively engage the cutter seat, second sub-gasket, and second sealing surface.

2. The valve of claim 1, wherein the cutter comprises a sharpened edge and a flat mating surface, the sharpened edge being configured to shear a unitary gasket into at least the first and second sub-gaskets and the flat mating surface configured to compressively engage the second sealing surface of the body.

3. The valve of claim 2, wherein the sharpened edge of the cutter extends forwardly beyond the flat mating surface of the cutter seat, such that the sharpened edge contacts the unitary gasket during installation of the cutter seat into the bore before the flat mating surface of the cutter seat contacts the unitary gasket.

4. The valve of claim 3, wherein the second sealing surface of the body comprises a channel extending into a portion of the second sealing surface to accommodate the cutter of the cutter seat.

5. The valve of claim 2, wherein the cutter further comprises a gasket trap formed of two surfaces extending inwardly from the sharpened edge and the flat mating surface, the two surfaces forming an angle between about 30° and about 150°.

6. The valve of claim 5, wherein a portion of the second sealing surface of the body extends into the gasket trap to define an approximately v-shaped cavity between the cutter seat and the body, the v-shaped cavity being configured to extrude the second sub-gasket into an approximately v-shaped cross-section when the second sub-gasket is compressed between the cutter seat and the body.

7. The valve of claim 2, wherein the second sealing surface of the body comprises one or more grooves extending into the second sealing surface, the one or more grooves configured to selectively compress a portion of the second sub-gasket.

8. The valve of claim 1, wherein a portion of the second sealing surface of the body is configured to compressively engage a soft seat.

9. The valve of claim 8, wherein the soft seat is formed of a material selected from the group consisting of reinforced tetrafluoroethylene (RTFE) and reinforced polytetrafluoroethylene (RPTFE).

10. The valve of claim 1, wherein the cutter seat comprises a sealing portion extending radially inward into a portion of the channel, the sealing portion being configured to engage and disengage a disk of the valve during operation.

11. A valve, the valve comprising:
a valve body having a channel extending there through;
a graphite gasket configured to be received on a first surface of the valve body, the first surface of the valve body extending radially outward from the channel;
a cutter seat comprising a cutter configured to sever the graphite gasket into at least a first annular sub-gasket and a second annular sub-gasket by compressively contacting the graphite gasket with a sharpened edge, the cutter seat being configured to engage a second surface of the valve body, the second surface of the valve body extending radially outward from the channel and being inwardly offset from the first surface of the valve body; and
a seat retaining ring configured to compress the first surface of the valve body, the graphite gasket, and the cutter seat.

12. The valve of claim 11, wherein the cutter seat comprises a mating surface configured to abut against the second surface of the valve body, and the sharpened edge extends forwardly beyond the mating surface.

13. The valve of claim 12, wherein a channel extends through a portion of the second sealing surface of the valve body to receive a portion of the cutter.

14. The valve of claim 11, wherein the cutter seat comprises a sealing portion configured to engage and disengage a disk of the valve, the sealing portion having an arcuate shape extending radially inward from an outer surface of the cutter seat.

15. The valve of claim 11, wherein the cutter comprises a gasket trap formed of two angled surfaces extending inwardly from the sharpened edge and the mating surface which form an angle between about 60° and about 120°.

16. The valve of claim 11, further comprising a soft seat configured to abut against the second surface of the valve body and the cutter seat.

17. A method of forming a multiple-plane seal within a valve assembly, the method comprising the steps of:
providing a valve body, the valve body having a channel extending there through, a first surface positioned radially outward from the channel, and a second surface located radially and axially inward from the first surface, so that the offset between the first surface and the second surface defines a cylindrical bore;
positioning a gasket on the first surface of the valve body so that a portion of the gasket extends radially inward beyond the first surface to cover a portion of the cylindrical bore;
urging a cutting element into the cylindrical bore towards the second surface of the valve body, the cutting element providing a sharpened edge approximately adjacent to a circumferential surface of the cylindrical bore, thereby cutting the portion of the gasket extending radially inward beyond the first surface of the valve body to form at least two annular sub-gaskets, the first sub-gasket residing on the first surface of the valve body and the second sub-gasket residing on the second surface of the valve body; and
coupling a retaining ring to the valve body in a way that causes the retaining ring to compress the first sub-gasket between a first surface of the retaining ring and the first surface of the valve body and compress the second sub-gasket between the cutting element and the second surface of the valve body.

18. The method of claim 17, wherein the gasket, valve body first surface, valve body second surface, and cutting element are all positioned substantially concentric with the channel extending through the valve body.

19. The method of claim 17, wherein the cutting element is formed integrally as part of a metal cutter seat having an outer surface defined by a radius slightly smaller in size than the radius defining the cylindrical bore.

20. The method of claim 17, wherein the step of coupling the retaining ring to the valve body is performed by threading a plurality of fasteners through the retaining ring into a plurality of threaded holes in the valve body.

* * * * *